United States Patent [19]
Kakizaki et al.

[11] Patent Number: 4,949,989
[45] Date of Patent: Aug. 21, 1990

[54] AUTOMOTIVE SUSPENSION SYSTEM WITH VARIABLE SUSPENSION CHARACTERISTICS AND VARIABLE DAMPING FORCE SHOCK ABSORBER THEREFOR

[75] Inventors: Shinobu Kakizaki; Fumiyuki Yamaoka; Shigeru Kikushima; Junichi Emura, all of Kanagawa, Japan

[73] Assignee: Atsugi Motor Parts Co., Ltd., Kanagawa, Japan

[21] Appl. No.: 340,062

[22] Filed: Apr. 18, 1989

[30] Foreign Application Priority Data

| Apr. 19, 1988 | [JP] | Japan | 63-53301[U] |
| Apr. 19, 1988 | [JP] | Japan | 63-53302[U] |
| Apr. 28, 1988 | [JP] | Japan | 63-58799[U] |
| Nov. 4, 1988 | [JP] | Japan | 63-279092 |

[51] Int. Cl.$^5$ .......................... F16F 9/50; B60G 17/00
[52] U.S. Cl. .................................... 280/707; 188/299; 188/319
[58] Field of Search ............... 188/299, 319; 280/707; 364/424.1, 426.02

[56] References Cited

U.S. PATENT DOCUMENTS

| 2,757,388 | 8/1956 | Chisholm ................................. 5/317 |
| 4,620,619 | 11/1986 | Emura et al. ........................ 188/299 |
| 4,682,675 | 7/1987 | Eddy, Jr. ............................... 188/299 |
| 4,800,994 | 1/1989 | Imaizumi et al. .................... 188/299 |
| 4,815,575 | 3/1989 | Murty .................................... 188/299 |
| 4,819,771 | 4/1989 | Britze ................................... 188/299 |
| 4,821,191 | 4/1989 | Ikemoto et al. ..................... 280/707 |
| 4,826,205 | 5/1989 | Kouda et al. ........................ 280/703 |
| 4,831,532 | 5/1989 | Kondo ................................... 280/707 |
| 4,832,162 | 5/1989 | Bacardit .............................. 188/299 |
| 4,835,714 | 5/1989 | Sano et al. ........................... 280/707 |
| 4,846,317 | 7/1989 | Hudgens ............................... 188/299 |

FOREIGN PATENT DOCUMENTS

| 2445764 | 4/1976 | Fed. Rep. of Germany . |
| 71517 | 1/1916 | Switzerland . |

Primary Examiner—Richard A. Bertsch
Attorney, Agent, or Firm—Bachman & LaPointe

[57] ABSTRACT

An automotive suspension system employs a pressure sensor means designed for monitoring fluid pressure in a fluid chamber of shock absorber to be compressed during piston bounding stroke. Variable suspension characteristics to vary suspension mode between HARD mode and SOFT mode so that suspension mode is normally set in SOFT mode and switched into HARD mode when the peak value of variation rate of the output of the sensor means is detected. The suspension system is provided a deadband for maintaining the suspension mode unchanged even when the peak of variation rate is detected.

60 Claims, 11 Drawing Sheets

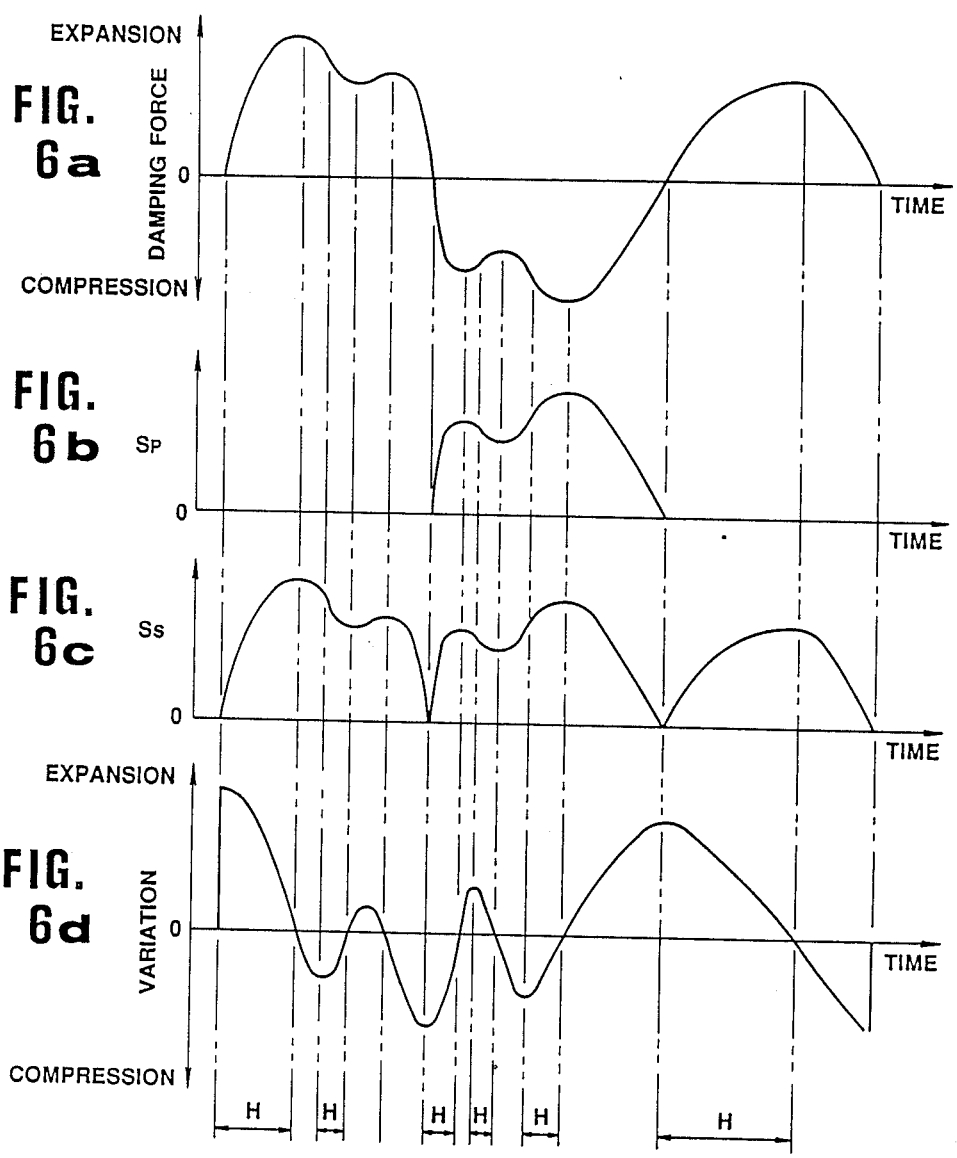

AUTOMOTIVE SUSPENSION SYSTEM WITH VARIABLE SUSPENSION CHARACTERISTICS AND VARIABLE DAMPING FORCE SHOCK ABSORBER THEREFOR

BACKGROUND OF THE INVENTION

1. Field of the Invention

The present invention relates generally to a suspension system for an automotive vehicle, which is variable of suspension characteristics with high response characteristics. More specifically, the invention relates to an automotive suspension system which is variable of damping characteristics per every vibration cycles. The invention further relates to a variable damping shock absorber which is applicable for the automotive suspension system.

DESCRIPTION OF THE BACKGROUND ART

In the recent automotive technologies, respective automotive components have been required high performance and high response. In case of a suspension system, it has been required high level of riding comfort and driving stability. In order to achieve both of high level riding comfort and high level driving stability, high response against vibration input to the suspension system has been required.

One of the typical variable damping force suspension system has been disclosed in Japanese Patent First (unexamined) Publication (Tokkai) Showa 61-85210. In the disclosed system, a piezoelectric element is disposed in each shock absorber in each suspension system for detecting variation of fluid pressure in the shock absorber. A control unit is provided for receiving an input indicative of the fluid pressure provided from the piezoelectric element. The control unit outputs a controlled voltage to the piezoelectric element for switching operation mode of the shock absorber at least between SOFT mode in which smaller damping force is to be generated in response to vibration input and HARD mode in which greater damping force is to be generated in response to vibration input.

In general, the control unit is responsive to low frequency input vibration which induces attitude change of the vehicle body to switch the operational mode of the shock absorber into HARD mode for a given period of time. While the shock absorber is maintained at the HARD mode, the piezoelectric element maintains operation as an actuator for maintaining HARD mode operation of the shock absorber. Therefore, while it is active as the actuator, the piezoelectric element can not monitor fluid pressure.

In the modern technology of suspension control, it has been considered that varying of damping characteristics of shock absorber between a piston compression stroke in response to bounding motion between the vehicle body and a road wheel and a piston expansion stroke in response to rebounding motion between the vehicle body and the road wheel in order to obtain better vibration stabilizing performance. Therefore, it is desirable to adjust the damping characteristics of the shock absorber depending upon the mode of piston action. In order to realize this, it is essential to detect the piston action mode on the basis of variation of the fluid pressure in the shock absorber. However, as set forth above, since the piezoelectric element is held in operative as the fluid pressure sensing element while the shock absorber is maintained at the HARD mode.

This may cause problem in damping shocks. For example, when the damping characteristics in the HARD mode is set to generate relatively great damping force in response to vibration input, damping force generated in response to piston compression mode action can amplify the input vibration. This tendency may be significant for the second and subsequent vibration cycles. This clearly degrades vibration stabilizing performance of the vehicle to provide rough ride feeling.

In addition, in the prior proposed suspension system operates substantially in passive manner to detect the input vibration based on variation of fluid pressure in the shock absorber. Namely, until the vehicle driving condition is changed to require switching of suspension characteristics, the suspension system will never operate to switch suspension characteristics. Therefore, when a criterion of the fluid pressure to switch the suspension mode from SOFT mode to HARD mode is set at relatively high value in order to provide better riding comfort, switch from SOFT mode to HARD mode tends to delay to cause bottoming due to low response characteristics particularly at the initial stage of switching of suspension mode.

SUMMARY OF THE INVENTION

Therefore, it is an object of the present invention to provide a suspension system for an automotive vehicle, which can provide variable suspension characteristics according to a vehicle driving condition with high precision level and high response level.

Another object of the present invention is to provide a variable damping force shock absorber for use in the suspension system of the invention.

In order to accomplish the aforementioned and objects, an automotive suspension system, according to the present invention, employs a pressure sensor means designed for monitoring fluid pressure in a fluid chamber of shock absorber to be compressed during piston bounding stroke. Variable suspension characteristics to vary suspension mode between HARD mode and SOFT mode so that suspension mode is normally set in SOFT mode and switched into HARD mode when the peak value of variation rate of the output of the sensor means is detected. The suspension system is provided a deadband for maintaining the suspension mode unchanged even when the peak of variation rate is detected.

According to one aspect of the invention, an automotive suspension system comprises:

a shock absorber disposed between a vehicle body and a suspension member rotatably supporting a road wheel, the shock absorber including a cylinder tube connected to one of the vehicle body and the suspension member and defining an internal space, a piston disposed within the internal space for dividing the internal space into first and second chambers and connected to the other of the vehicle body and the suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tube;

a valve means associated with the fluid communication means for controlling flow restriction of the fluid communication means, the valve means being variable of flow restriction characteristics for varying damping characteristics of the shock absorber;

a sensor means for monitoring fluid pressure in the first chamber for producing a piston stroke indicative signal indicative of magnitude of piston stroke;

an actuating means, associated with the valve means and responsive to a control signal, for controlling the valve means for adjusting flow restriction characteristics according the the control signal; and a controlling means, receiving the piston stroke indicative signal, for deriving a piston motion representative data on the basis of the piston stroke indicative signal, comparing the piston motion representative data with a predetermined deadband criteria which are set with respect to a neutral value and defining a predetermined deadband, and detecting the piston motion representative data out of the deadband and reaching a peak value for producing the control signal for harder damping characteristics and detecting the piston motion representative data varying across the neutral value for producing the control signal for softer damping characteristics.

According to another aspect of the invention, an automotive suspension system comprises:

a shock absorber disposed between a vehicle body and a suspension member rotatably supporting a road wheel, the shock absorber including a cylinder tube connected to one of the vehicle body and the suspension member and defining an internal space, a piston disposed within the internal space for dividing the internal space into first and second chambers and connected to the other of the vehicle body and the suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tube;

a valve means associated with the fluid communication means for controlling flow restriction of the fluid communication means, the valve means being variable of flow restriction characteristics for varying damping characteristics of the shock absorber;

a sensor means for monitoring fluid pressure in the first chamber for producing a piston stroke indicative signal indicative of magnitude of piston stroke;

an actuating means, associated with the valve means and responsive to a control signal, for controlling the valve means for adjusting flow restriction characteristics according the the control signal; and a controlling means, receiving the piston stroke indicative signal, for deriving a piston motion representative data on the basis of the piston stroke indicative signal, comparing the piston motion representative data with a predetermined deadband criteria which are set with respect to a neutral value and defining a predetermined deadband, and detecting the piston motion representative data out of the deadband and reaching a peak value for producing the control signal for harder damping characteristics and detecting the piston motion representative data entering into the deadband for producing the control signal for softer damping characteristics.

According to a further aspect of the invention, an automotive suspension system comprises:

a shock absorber disposed between a vehicle body and a suspension member rotatably supporting a road wheel, the shock absorber including a cylinder tube connected to one of the vehicle body and the suspension member and defining an internal space, a piston disposed within the internal space for dividing the internal space into first and second chambers and connected to the other of the vehicle body and the suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tube;

a valve means associated with the fluid communication means for controlling flow restriction of the fluid communication means, the valve means being variable of flow restriction characteristics for varying damping characteristics of the shock absorber;

a sensor means for monitoring fluid pressure in the first chamber for producing a piston stroke indicative signal indicative of magnitude of piston stroke;

an actuating means, associated with the valve means and responsive to a control signal, for controlling the valve means for adjusting flow restriction characteristics according the the control signal; and a controlling means, receiving the piston stroke indicative signal, for deriving a piston motion representative data on the basis of the piston stroke indicative signal, comparing the piston motion representative data with a predetermined deadband criteria which are set with respect to a neutral value and defining a predetermined deadband for producing the control signal for harder damping characteristics, and detecting the piston motion representative data varying across one of the deadband criteria to be out of the deadband for producing the control signal for softer damping characteristics, detecting the piston motion representative data reaching a peak value for producing the control signal for harder damping characteristics.

According to a still further aspect of the invention, an automotive suspension system comprises:

a shock absorber disposed between a vehicle body and a suspension member rotatably supporting a road wheel, the shock absorber including a cylinder tube connected to one of the vehicle body and the suspension member and defining an internal space, a piston disposed within the internal space for dividing the internal space into first and second chambers and connected to the other of the vehicle body and the suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tube a valve means associated with the fluid communication means for controlling flow restriction of the fluid communication means, the valve means being variable of flow restriction characteristics for varying damping characteristics of the shock absorber;

a sensor means for monitoring fluid pressure in the first chamber for producing a fluid pressure indicative signal indicative of magnitude of fluid pressure;

an actuating means, associated with the valve means and responsive to a control signal, for controlling the valve means for adjusting flow restriction characteristics according the the control signal; and a controlling means, receiving the fluid pressure indicative signal, for deriving a pressure variation representative data on the basis of the fluid pressure indicative signal, comparing the pressure variation representative data with a predetermined deadband criteria which are set with respect to a neutral value and defining a predetermined deadband, and detecting the pressure variation representative data out of the deadband and reaching a peak value for producing the control signal for harder damping characteristics and detecting the pressure variation representative data varying across the neutral value for producing the control signal for softer damping characteristics.

According to a yet further aspect of the invention, an automotive suspension system comprises:

a shock absorber disposed between a vehicle body and a suspension member rotatably supporting a road wheel, the shock absorber including a cylinder tube connected to one of the vehicle body and the suspension member and defining an internal space, a piston disposed within the internal space for dividing the internal space into first and second chambers and connected to the other of the vehicle body and the suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tube;

a valve means associated with the fluid communication means for controlling flow restriction of the fluid communication means, the valve means being variable of flow restriction characteristics for varying damping characteristics of the shock absorber;

a sensor means for monitoring fluid pressure in the first chamber for producing a fluid pressure indicative signal indicative of magnitude of fluid pressure;

an actuating means, associated with the valve means and responsive to a control signal, for controlling the valve means for adjusting flow restriction characteristics according the the control signal; and a controlling means, receiving the fluid pressure indicative signal, for deriving a pressure variation representative data on the basis of the fluid pressure indicative signal, comparing the pressure variation representative data with a predetermined deadband criteria which are set with respect to a neutral value and defining a predetermined deadband, and detecting the pressure variation representative data out of the deadband and reaching a peak value for producing the control signal for harder damping characteristics and detecting the pressure variation representative data entering into the deadband for producing the control signal for softer damping characteristics.

According to still further aspect of the invention, an automotive suspension system comprises:

a shock absorber disposed between a vehicle body and a suspension member rotatably supporting a road wheel, the shock absorber including a cylinder tube connected to one of the vehicle body and the suspension member and defining an internal space, a piston disposed within the internal space for dividing the internal space into first and second chambers and connected to the other of the vehicle body and the suspension member for relative movement with respect to the cylinder tube, the first and second chambers being filled with a working fluid;

a fluid communication means for establishing fluid communication between the first and second chambers with a limited fluid flow rate for generating a damping force against relative motion between the piston and the cylinder tube;

a valve means associated with the fluid communication means for controlling flow restriction of the fluid communication means, the valve means being variable of flow restriction characteristics for varying damping characteristics of the shock absorber;

a sensor means for monitoring fluid pressure in the first chamber for producing a fluid pressure indicative signal indicative of magnitude of fluid pressure;

an actuating means, associated with the valve means and responsive to a control signal, for controlling the valve means for adjusting flow restriction characteristics according the the control signal; and a controlling means, receiving the fluid pressure indicative signal, for deriving a pressure variation representative data on the basis of the fluid pressure indicative signal, comparing the pressure variation representative data with a predetermined deadband criteria which are set with respect to a neutral value and defining a predetermined deadband for producing the control signal for harder damping characteristics, and detecting the pressure variation representative data varying across one of the deadband criteria to be out of the deadband for producing the control signal for softer damping characteristics, detecting the pressure variation representative data reaching a peak value for producing the control signal for harder damping characteristics.

The sensor means may comprise a first piezoelectric element and the actuating means comprises a second piezoelectric element. The controlling means may increase the control signal value at a predetermined rate for increasing flow restriction at a predetermined rate. The controlling means may decrease the control signal value at a predetermined rate for decreasing flow restriction at a predetermined rate.

The controlling means derives flow restriction to be represented by the control signal on the basis of a peak value of the variation rate of the pressure indicative signal. The automotive suspension system may further comprise a vehicle speed sensor for monitoring a vehicle speed to produce a vehicle speed indicative signal, and the arithmetic means varies the deadband criteria according to variation of the value of the vehicle speed indicative signal.

The arithmetic means may continuously vary the deadband criteria for varying the width of the deadband according to variation of the value of the vehicle speed indicative signal. Alternatively, the arithmetic means may vary the deadband criteria for varying the width of the deadband in stepwise fashion according to variation of the value of the vehicle speed indicative signal. In the later case, the arithmetic means varies the width of the deadband between a first wider width and a second narrower width which is selected when the value of the vehicle speed indicative signal is greater than a predetermined first vehicle speed criterion. Furthermore, the arithmetic means may set a second vehicle speed criterion at a value smaller than the first vehicle speed criterion for switching the width of the deadband from the narrower width to the wider width when the vehicle speed indicative signal value decreases thereacross.

BRIEF DESCRIPTION OF THE DRAWINGS

The present invention will be understood more fully from the detailed description of the invention given herebelow and from the accompanying drawings of the present invention, which, however, should not be taken to limit the invention to the specific embodiment, but are for explanation and understanding only.

In the drawings:

FIG. 6 is a timing chart showing variation of suspension mode in relation to variation of damping force to be generated in the shock absorber;

DESCRIPTION OF THE PREFERRED EMBODIMENT

Figure 1:
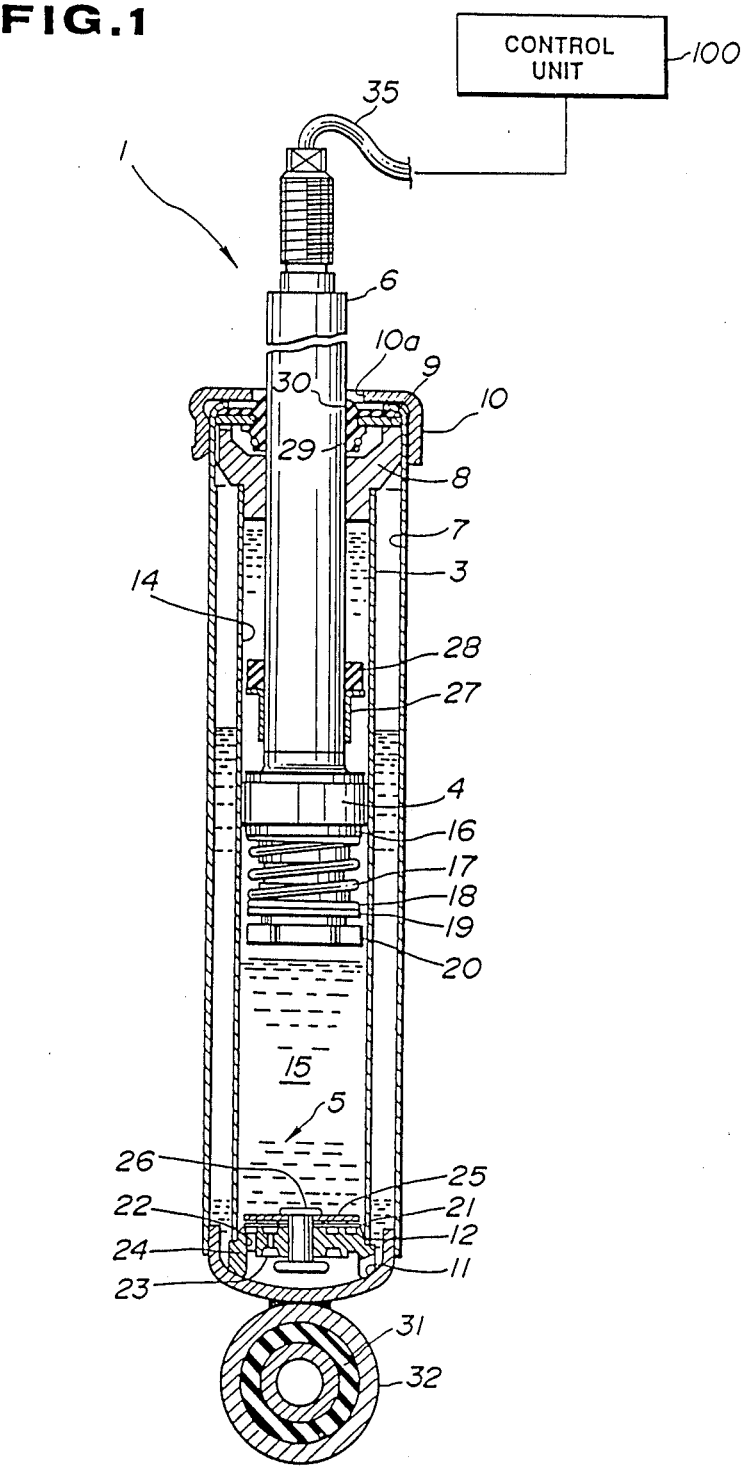
FIG. 1 is a section of preferred embodiment of a variable damping force shock absorber according to the present invention, which is associated with a control unit implementing a preferred process of suspension control.

Referring now to the drawings, particularly to FIG. 1, the preferred embodiment of a shock absorber, according to the present invention, serves as a principle component of the preferred embodiment of an automotive suspension system, according to the invention. The shown shock absorber 1 comprises a double action type shock absorber variable of damping characteristics. The shock absorber 1 has inner and outer cylinder tubes 3 and 2. The inner and outer cylinders 3 and 2 are arranged in coaxial arrangement for defining an annular chamber 7 which serves as a reservoir chamber.

A piston assembly 4 is disposed within the internal space of the inner cylinder tube 3 for dividing the internal space into upper and lower working chambers 14 and 15. The piston assembly 4 is supported on the lower end of a piston rod 6. The piston rod 6 is a guided by a rod guide 8 is engaged in the top end opening of the inner cylinder tube 3. The rod guide 8 cooperates with a piston seal 9 and a stopper plate 10 to form an upper plug assembly for sealingly closing the top ends of the inner and outer cylinder tubes 3 and 2.

The top end of the piston rod 6 is connected to a vehicle body (not shown) in per se known manner. On the other hand, a connecting eye 32 with an eye bushing 31 is provided on the lower end of the outer cylinder tube 2. The outer cylinder tube 2 is connected to a suspension member (not shown) rotatably supporting a road wheel. By this, the shock absorber 1 is disposed between the vehicle body and the suspension member to receive vibration energy causing relative displacement between the vehicle body and the suspension member. The shock absorber 1 is compressed in response to bounding stroke motion, in which the vehicle body and the suspension member are shifted to approach to each other, and expanded in response to a rebounding stroke motion, in which the vehicle body and suspension member are shifted away to each other. In response to the bounding stroke motion of the vehicle body and the suspension member, the piston assembly 4 strokes in compression stroke direction with compressing the lower working chamber 15. This causes increasing of working fluid pressure in the lower working chamber and decreasing of the working fluid pressure in the higher working chamber. On the other hand, in response to the rebounding stroke motion of the vehicle body and the suspension member, the piston assembly 4 strokes in expansion stroke direction with compressing the higher working chamber 14. Therefore, the fluid pressure in the upper working chamber 14 is increased and the fluid pressure in the lower working chamber 15 is decreased. The fluid reservoir chamber 7 is normally maintained at a pressure substantially corresponding to fluid pressure in the lower working chamber 15. stroke motion, The lower end opening of the inner cylinder 3 is closed by a bottom valve assembly 12 which defines a communication path 11. The bottom valve assembly 12 thus establishes fluid communication between the fluid reservoir chamber 7 and the lower working chamber 15.

The piston assembly 4 accompanies an expansion valve 16 which is effective in a piston expansion stroke to produce a damping force. The expansion valve 16 is associated with a bias spring 17 which is active on the expansion valve 16 to constantly bias the latter in upward direction. The bias spring is mounted on the lower end of the piston rod 6 by means of an adjuster nut 18 and a lock nut 19. An adjuster nut 20 also engages with the lower end of the piston rod 6.

The bottom valve assembly 5 has a check valve 21 associated with a port 22 for openably closing the port. The check valve 21 is designed to open during piston expansion stroke to permit fluid flow from the reservoir chamber 7 to the lower working chamber 15. The bottom valve 5 is also provided with a compression valve 23 which is associated with the lower end of an orifice 24 to open in response to compression stroke in order to establish fluid communication from the lower working chamber 15 to the reservoir chamber 7. The check valve 21 and the compression valve 23 are mounted and secured on a bottom valve body 12 by means of a clamping pin 26. A stopper plate 25 is also mounted on the bottom valve body 12 in order to restrict magnitude of opening of the check valve 21. With the shown construction, the check valve 21 is responsive to the pressure difference between the lower working chamber 15 and the fluid reservoir chamber 7 to be shifted to the open position for introducing the working fluid in the fluid reservoir chamber into the lower working chamber. On the other hand, during piston compression stroke, pressure difference between the lower working chamber 15 and the fluid reservoir chamber 7 is created to shift the compression valve 23. By opening of the compression valve 23, a limited flow rate of the working fluid is permitted to flow from the lower working chamber 15 to the fluid reservoir chamber 7 with generating a damping force.

A rebounding stopper 28 which is made of an elastic material, such as a rubber, is mounted on the piston rod 6 by means of a retainer 27. The rebounding stopper 28 protects the piston assembly 4 from direct collision onto the lower end of the rod guide 8.

The stopper plate 10 is clamped onto the upper end of the outer cylinder tube 2. The stopper 10 defines a center opening 10a, through which the piston rod 6 extends. A rubber bushing (not shown) engages with the periphery of the center opening plate 10a of the stopper plate 10 for slidingly and sealingly guide the piston rod 6. A main lip 29 and a dust lip 30 are also provided in the upper plug assembly. The main lip 29 sealingly contact with the outer periphery of the piston rod for establishing a fluid tight seal. On the other hand, the dust lip 30 is provided in the vicinity of the stopper plate and contacts with the outer periphery of the piston rod 4 to establish fluid tight seal so as to prevent the muddy water, dust and so forth.

The piston assembly 4 is designed to vary damping characteristics to generate damping force in response to vibration input according to variable characteristics in different damping mode. In order to control the damping mode of the piston assembly 4, a control unit 100 is connected to the piston assembly via a harness 35 which extends through the piston rod.

Figure 2:
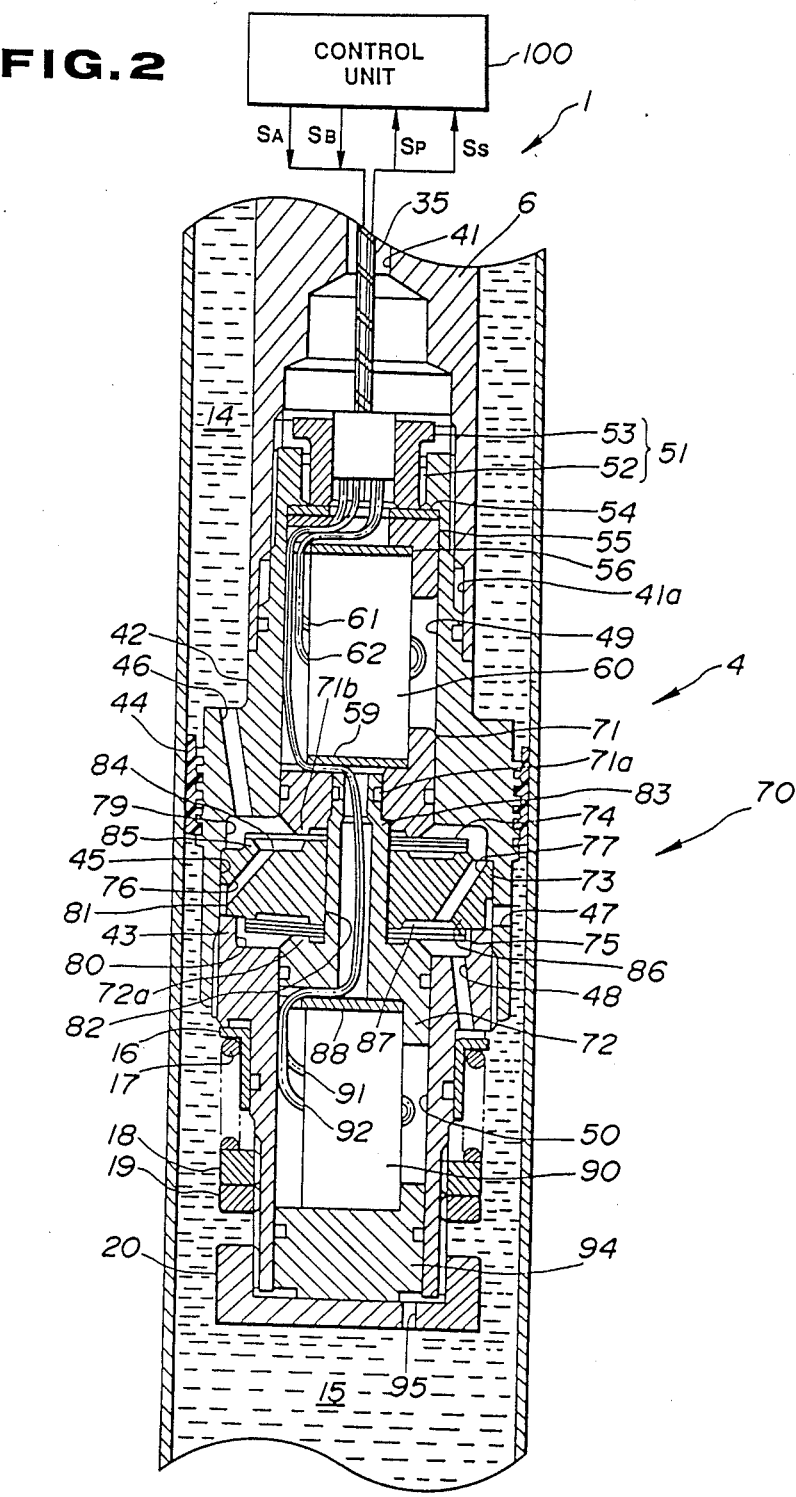
FIG. 2 is an enlarged section of the major part of the preferred embodiment of the variable damping force shock absorber, according to the invention.

FIG. 2 shows the detailed construction of the piston assembly 4 employed in the preferred embodiment of the shock absorber 1 of FIG. 1. As seen, the piston rod 6 defined an axially extending through opening 41 through which the wiring harness 35 extends. The lower end of the through opening 41 is communicated with a threaded groove 41a forming a piston receptacle. The piston assembly 4 includes a piston body 42 which has an upward extension which threadingly engages with the threaded groove 41a of the piston rod 6 so that the piston body 42 is firmly mounted on the lower end of the piston rod 6. The piston body 42 has an outer periphery mating with the inner periphery of the inner cylinder 3. A low friction seal member 44 which is made of a low friction material, such as a teflon, engages on the outer periphery of the piston body 42 for establishing the fluid tight seal between the inner periphery of the inner cylinder 3. The piston body 42 has a threaded lower end, to which the upper end of a sleeve 43 engages. The aforementioned adjusting nut 18, the lock nut 19 and the adjusting nut 20 are engaged onto the outer periphery of the lower end portion of the sleeve 43.

The piston body 42 defines an internal space 45 which is in communication with the upper and lower working chambers via communication path 46 and 47 defined therethrough. On the other hand, the sleeve 43 defines a through opening 48 for communication between the internal space 45 and the lower working chamber 15. The expansion valve 16 is associated with the end of the through opening 48 opening to the lower working chamber 15 so as to restrict fluid flow path area for generating damping force. The expansion valve 16 is responsive to a fluid pressure overcoming the spring force of the bias spring 17 to widen the path area for pressure relieving function.

The assembly of the piston body 42 and the sleeve 43 defines first and second chambers 49 and 50 of essentially circular cross section. These first and second chambers 49 and 50 have smaller diameter than the space 45 and communicated with the later. A first piezoelectric element 60 is disposed within the first chamber 49. The first piezoelectric element 60 has an upper section associated with an adjusting mechanism 51. The adjusting mechanism 51 comprises an adjuster screw 53 engaging with a female thread 52 formed on the inner periphery of the top end of the piston body 42. The adjuster nut 53 has a lower end coupled with an upper end plate 56 fixed onto the upper end of the piezoelectric element 60 via a contact plate 54 and a cap 55. The adjuster screw 53 is manually rotatable for axial shifting to cause axial displacement of the piezoelectric element 60. The piezoelectric element 60 is associated with a slider member 71 via a lower end plate 59.

Similarly, a second piezoelectric element 90 is disposed within the second chamber 50. The second piezoelectric element 90 is supported within the second chamber by means of a cap 94 and the adjuster nut 20, so that the axial position thereof can be adjusted by means of the adjusting nut. The upper end of the second piezoelectric element 90 is associated with a valve core 72 via an upper end plate 88.

The slider 71 and the valve bore 72 are associated with a valve body 73 to form a damping mode control mechanism 70. As seen, the valve body 73 is disposed within the space 45 to define therein upper and lower annular chambers 79 and 80. The valve body 73 further defines an annular chamber 81 defined between the outer periphery of the valve body 73 and the inner periphery of the piston body 42. The upper annular chamber 79 is in communication with the upper working chamber 14 via a communication path 48. On the other hand, the lower annular chamber 80 is in communication with the flow working chamber 15 via the through opening 48. The annular chamber 81 is in communication with the lower working chamber 15 with the fluid path 47. The valve body 73 defines a center opening 82 through which an upper cylindrical section 83 of the valve core 72 extends, and communication orifices 76 and 77 The communication orifice 76 opens to an annular groove 84 formed on the upper surface of the valve body and surrounded by an annular land 85. The annular groove 84 is exposed to the upper annular chamber 79. The communication orifice 76 also opens to the annular chamber 81. On the other hand, the communication orifice 77 opens to an annular groove 87 formed on the lower surface of the valve body 72 and surrounded by an annular land 86. The annular groove 86 is exposed to the lower annular chamber 80. The communication orifice 77 also opens to the upper annular chamber 79.

Upper and lower valve members 74 and 75 are provided for openably closing the annular grooves 84 and 87 and whereby blocking fluid communication between the annular grooves and the associated annular chambers 79 and 80. The valve members 74 and 75 comprises leaf springs resiliently deformable in response to the pressure exerted thereto. Normally, the valve members 74 and 75 are supported at the center boss sections projecting at the center portion of valve body. At this position, the lever length of the valve members 74 and 75 is relatively large to have an initial stiffness to cause resilient deformation in response to the fluid pressure exerted thereto. On the other hand, when the annular projections 71b and 72a of the slider 71 and the valve core 72 are active on the valve member 74 and 75 when the slider and valve cores are operated by the effect of the piezoelectric elements 60 and 90, the lever lengths of the valve members are reduced to increase stiffness for generating greater damping force in response to vibration input. In the following discussion, the damping mode where the valve member 74 and 75 operates in smaller stiffness, in which the annular projections 71b and 72 of the slider and valve core are not active, will be referred to as SOFT mode. On the other hand, the damping mode where the annular projections are active to increase stiffness, will be hereafter referred to as HARD mode.

It should be noted that the valve members 74 and 75 can comprise a plurality of thin disc shaped relief springs for resilient deformation in response to the fluid pressure exerted thereonto.

As seen from FIG. 2, the first and second piezoelectric elements 60 and 90 are connected to the control unit 100 via cables 61, 62, 91 and 92 which forms the wiring harness. As can be clearly seen from FIG. 4, the cables 61 and 91 connect respectively associated piezoelectric elements 60 and 90 to the ground. On the other hand, the cables 62 and 92 connect the piezoelectric elements 60 and 90. Each of the piezoelectric elements 60 and 90 comprises a plurality of thin disc shaped piezoelectric plates piled up in series. Each of the piezoelectric plates respectively having a pair of electrodes. As is well known, when a voltage is applied to such piezoelectric plates to cause electrodistortion to expand and contact the axial length. The magnitude of electrodistortion is variable depending upon the magnitude of voltage applied to the piezoelectric plates. Such electrodistortion may cause mechanical distortion of the piezoelectric element to cause variation of the axial length.

On the other hand, when the fluid pressure is applied to the piezoelectric elements 60 and 90, each of the piezoelectric plate as the components of the piezoelectric elements is caused mechanical distortion for producing an electric power. The magnitude of the electric power to be generated by the piezoelectric elements 60 and 90 is variable depending upon the magnitude of the mechanical distortion and whereby corresponding to the magnitude of the pressure exerted on the piezoelectric elements. In the practical construction, the first piezoelectric element 60 is subject a fluid pressure of the annular chamber 81 exerted on the valve member 74 which corresponds to the fluid pressure in the lower working chamber 15, via the slider. The first piezoelectric element 60 is thus produces a compression mode pressure indicative signal Sp. On the other hand, the second piezoelectric element 90 is subject fluid pressure in the upper annular chamber 79 exerted on the valve member via the valve member 75 and the valve core 72, which fluid pressure corresponds to that in the upper fluid chamber 14. The second piezoelectric element 90 thus produces a expansion mode pressure indicative signal Ss. As will be appreciated, the magnitude of the compression mode pressure indicative signal Sp and the expansion mode pressure indicative signal Ss are variable depending upon the magnitude of pressure in the upper and lower working chambers 14 and 15. In addition, in the piston compression stroke, the fluid pressure in the lower working chamber 15 is also exerted on the second piezoelectric element 90 via the adjuster nut 20 and a cap 94. Therefore, even in the piston expansion stroke, the second piezoelectric element 90 outputs the expansion mode pressure indicative signal Ss. Therefore, in the piston expansion stroke, only expansion mode pressure indicative signal Ss is output from the piezoelectric element 90. On the other hand, in the piston compression stroke, both of the compression mode and expansion mode pressure indicative signals Sp and Ss are output from the first and second piezoelectric elements 60 and 90.

The piezoelectric elements 60 and 90 feeds the compression mode pressure indicative signal Sp and the expansion mode pressure indicative signal Ss to the control unit 100. The control unit 100 processes these compression mode and expansion mode pressure indicative signals Sp and Ss to produce an expansion mode control signal $S_A$ A and a compression mode control signal $S_B$. The expansion mode control signal $S_A$ is fed to the first piezoelectric element 60 for controlling axial length thereof to adjust the position of the valve core 72 and whereby adjust the stiffness of the valve members 74 and 75. By adjusting the stiffness of the valve member 75, the damping characteristics in response to the piston expansion stroke can be switched between HARD mode and SOFT mode. Similarly, the compression mode control signal $S_B$ is applied to the second piezoelectric element 90 for controlling the axial length thereof to adjust the position of the slider 71 relative to the valve members 74 and 75 and whereby adjusts the stiffness of the associated valve member in order to switch the damping mode between HARD mode and SOFT mode. By this, the damping characteristics in the piston compression stroke can be adjusted.

Figure 3:
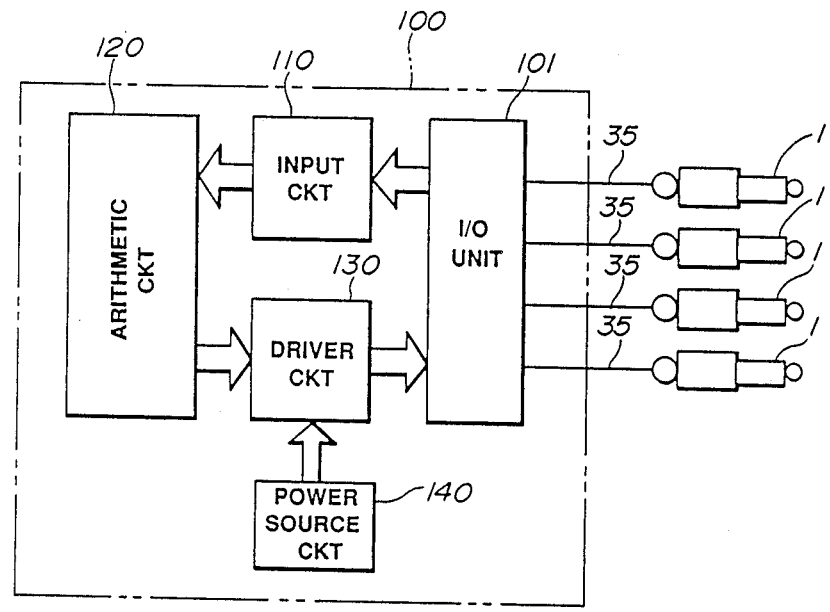
FIG. 3 is a block diagram of the control unit employed in the preferred embodiment of an automotive suspension system and designed for implementing the preferred suspension control process.
Figure 4:
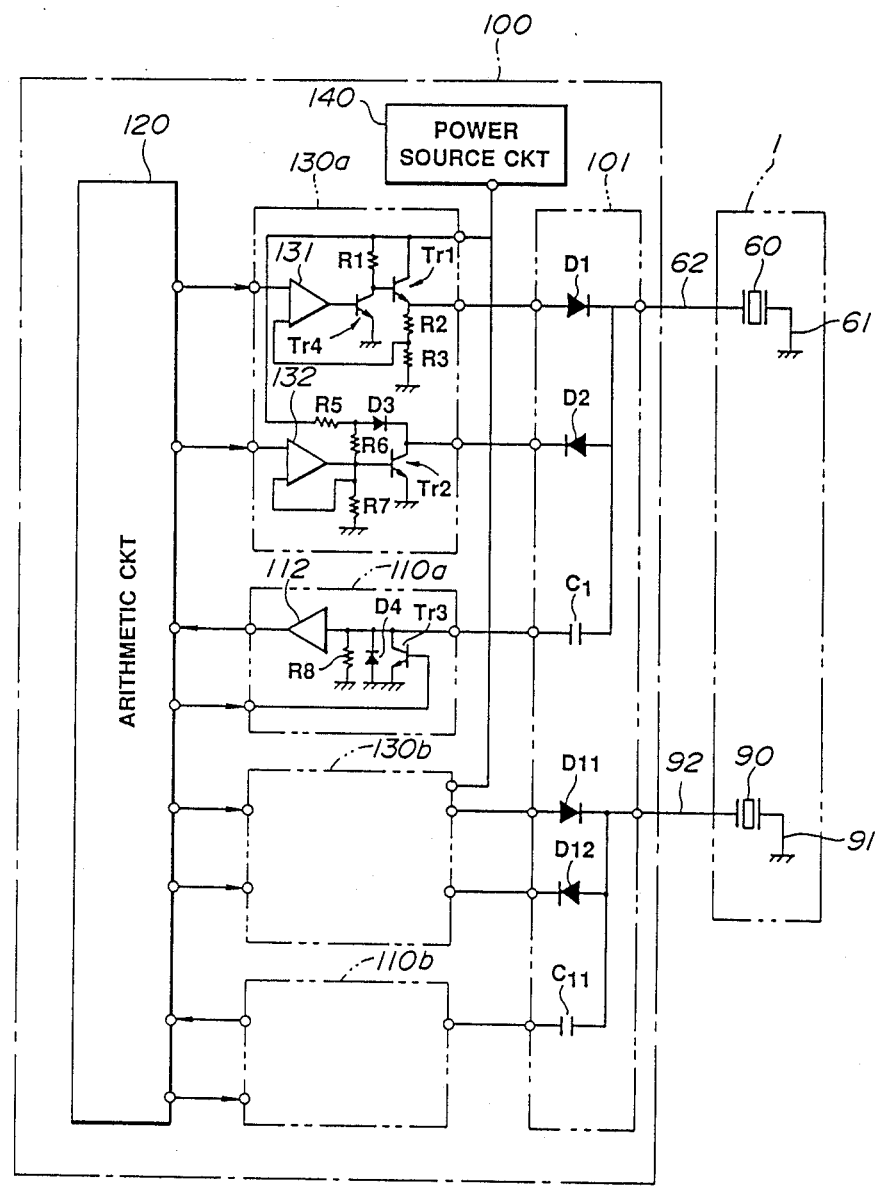
FIG. 4 is a detailed block diagram of the control unit of FIG. 3.

As shown in FIG. 3, the control unit 100 comprises a microprocessor based circuit including an input/output (I/0) port 101, an input circuit 110, an arithmetic circuit 120, a driver circuit 130 and a driver power source circuit 140. The I/0 unit 101 is connected to respective damping control mechanisms 70 of the shock absorbers 1 disposed in front-left, front-right, rear-left and rear-right suspension systems via the cables 62 and 92 of the wiring harnesses 35. The compression mode pressure indicative signals Sp and the expansion mode pressure indicative signals Ss generated by the piezoelectric elements 60 and 90 of respective shock absorbers 1 are input to the control unit 100 through the I/0 port 101. The I/0 unit 101 has a plurality of control channels respectively adapted to control the piezoelectric elements 60 and 90 in respective shock absorbers 1 of front-left, front-right, rear-left and rear-right suspension systems, though FIG. 4 shows only one shock absorber 1. Each control channel has first and second I/0 sections 101a and 101b for receiving pressure indicative signals Sp and Ss and outputting the control signals $S_A$ and $S_B$. The first control section 101a has a capacitor $C_I$ for receiving the compression mode pressure indicative signal Sp and serving as a filter for removing noise direct current component in input signal. The first control section 101a also has a pair of diodes $D_1$ and $D_2$ arranged at opposite polarities.

Similarly, the second control section 101b has a capacitor $C_{11}$ for receiving the compression mode pressure indicative signal Ss and serving as a filter for removing noise direct current component in input signal. The second control section 101b also has a pair of diodes $D_{11}$ and $D_{12}$ arranged at opposite polarities.

The capacitors $C_1$ and $C_{11}$ are connected to first and second sections 110a and 110b of the input circuit 110 respectively. The first section 130a includes a switching transistor $Tr_3$ and an amplifier 112. The switching transistor $Tr_3$ has a base electrode connected to one output terminal of the arithmetic circuit to receive therefrom a selector command. The transistor $Tr_3$ has a collector electrode connected to a junction between the capacitor $C_1$ of the I/O unit 101 and the amplifier 112. The emitter electrode of the switching transistor $Tr_3$ is grounded. In addition, the first section 110a includes a diode $D_4$ and a resistor $R_8$. With the shown construction, the selector command is normally held OFF to input LOW level command to the base electrode of the switching transistor $Tr_3$. Therefore, the switching transistor $Tr_3$ is normally held OFF to break connection between the junction and the ground. At this position, the compression mode pressure indicative signal Sp is fed to the amplifier 112 and subsequently to the arithmetic circuit 120. On the other hand, the switching transistor $Tr_3$ is responsive to the HIGH level selector command to turn ON to establish grounding circuit for grounding the junction between the capacitor $C_1$ and the amplifier 112. As a result, the compression mode pressure indicative signal Sp from the first piezoelectric element 60 is grounded. Therefore, the input to arithmetic circuit 120 from the amplifier 112 becomes substantially zero.

Figure 5:
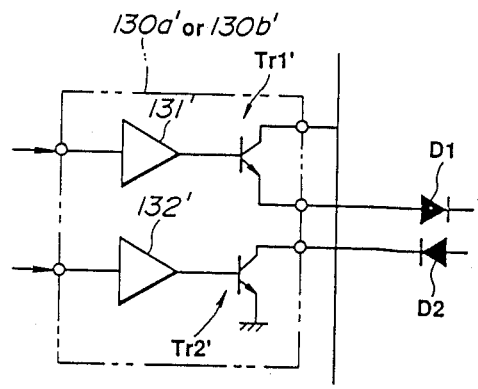
FIG. 5 is circuit diagram of the simplified modification of an output circuit in the control unit.

It should be should be appreciate, though FIG. 5 shows simple block 110b to show the second section of the input circuit, the circuit construction and function of the second section are identical to that discussed with respect to the first section.

The driver circuit 130 also includes first and second sections 130a and 130b. The first section 130a of the driver circuit 130 has a control section 130c and a switching section 130d. Both of the control section 130c and the switching section 130d are connected to the arithmetic circuit 120 for receiving the expansion mode control signal $S_A$. The control section 130c has an operational amplifier 131 high compares the expansion mode control signal level $S_A$ with a feedback signal level fed back from the output end via a voltage divider constituted by resistors $R_2$ and $R_3$. As long as the expansion mode control signal level is higher than the feedback signal level, the output level of the operational amplifier 131 outputs LOW level signal to maintain the input level of a gate electrode of a transistor $Tr_4$ at LOW level. Therefore, the bias at the collector electrode of the transistor $Tr_4$ becomes HIGH to turn a transistor $Tr_1$ ON. By turning ON of the transistor $Tr_1$, the driver voltage is fed to the piezoelectric element 60 to expand the axial length of the latter to switch the damping mode of the damping mode control mechanism 70 from SOFT mode to HARD mode.

On the other hand, the switching section 130d also has an operational amplifier 132. The operational amplifier 132 receives the expansion mode control signal $S_A$ and compares the expansion mode control signal level with a reference level which is input from the driver power source circuit via a resistor $R_5$ and a voltage divider constituted by resistors $R_6$ and $R_7$. With this circuit connection, the output of the operational amplifier 132 is maintained at LOW level to maintain a switching transistor $Tr_2$ at non-conductive state for blocking communication between the diode $D_2$ and the ground while the input level from the arithmetic circuit 120 stays lower than a reference level input from the voltage divider of the resistors $R_6$ and $R_7$. It should be noted that the reference level is determined by the resistances of the resistances of the resistors $R_6$ and $R_7$, which reference level is set at a level corresponding to a predetermined initial stress level to exert on the first piezoelectric element 60. On the other hand, when the expansion mode control signal level $S_A$ from the arithmetic circuit is higher than or equal to the reference level, the output level of the operational amplifier 132 turns into HIGH level to turn the transistor $Tr_2$ ON. As a result, the diode $D_2$ is connected to the ground via the transistor $Tr_2$. Therefore, the voltage signal as the driver voltage on the cable 62 is grounded so that the expansion mode control signal voltage $S_A$ applied to the first piezoelectric element 60 can be discharged. The Transistor $Tr_2$ is maintained in conductive stare until the potential at the first piezoelectric element 60 drops to the initial level, at which the input level from the arithmetic circuit is lowered across the reference level.

It should be noted while the shown construction employs a specific circuit construction to implement the desired mode switching operation for switching operational mode of the first piezoelectric element 60 between a sensor mode for monitoring the fluid pressure in the lower working fluid chamber 15 and an actuator mode for controlling damping mode, it is possible to employ different construction of circuit. For example, as shown in FIG. 5, each of the output circuits 130a and 130b can comprise a pair of buffer amplifier 131' and 132' and transistors $Tr_1'$ and $Tr_2'$. In such case, the arithmetic circuit 120 selectively feeds the expansion mode control signal $S_A$ for the buffer amplifiers 131' and 132'. Namely, while the harder damping characteristics is to be ordered, the arithmetic circuit 120 feeds the expansion mode control signal $S_A$ to the buffer amplifier 131' to turn the transistor $Tr_1'$ conductive to apply controlled voltage of the expansion mode control signal. On the other hand, in order to lower damping characteristics, the expansion mode control signal is fed to the buffer amplifier 132' to make the transistor $Tr_2'$ ON to complete grounding circuit for discharging the control signal voltage applied to the first piezoelectric element 60.

As will be seen herefrom, the piezoelectric element 60 acting for monitoring the fluid pressure level in the lower working chamber 15, the capacitor $C_1$ of the first section 101a of the I/0 unit 101, the first section 110a, the arithmetic circuit 120, the second section 130b of the output circuit and pair of diodes $D_{11}$ and $D_{12}$ of the second section 101b of the I/0 unit 101, and the piezoelectric element 90 acting for adjusting the damping mode of the damping mode control mechanism 70 form a compression mode control channel. On the other hand, the second piezoelectric element 90 acting for monitoring the fluid pressure level in the upper working chamber 14, the capacitor $C_{11}$ of the second section 101b of the I/0 unit 101, the second section 110b, the arithmetic circuit 120, the second section 130a of the output circuit and pair of diodes $D_1$ and $D_1$ of the first section 101a of the I/0 unit 101, and the piezoelectric element 60 acting for adjusting the damping mode of the damping mode control mechanism 70 form an expansion mode control channel.

In order to initially set the piezoelectric elements 60 and 90, adjustment is performed by means of the adjuster nuts 53 and 20. Namely, a predetermined voltage is applied for respective piezoelectric elements 60 and 90. At this position, the adjusted nuts 53 and 20 are rotated to adjust stress to be exerted on the piezoelectric elements 60 and 90. This adjustment is continued until the outlet levels of the piezoelectric elements 60 and 90 become a predetermined level.

The operation to be performed in the preferred embodiment of the suspension system will be discussed herebelow with reference to FIGS. 6 to 8.

As shown in FIG. 6(c), the fluid pressure in the upper working chamber 14 is monitored by the second piezoelectric element 90 during the piston expansion stroke. The piezoelectric element 90 is thus produces the the expansion mode pressure indicative signal Ss. At this time, since the output first piezoelectric element 60 is maintained at zero level, discrimination can be made that the piston is in the expansion stroke. Discrimination is made by the arithmetic circuit 120 in the control unit 100. Then, the arithmetic circuit 120 performs arithmetic operation to derive variation rate of the expansion mode pressure indicative signal Ss. The variation rate of the pressure indicative signals Ss and Sp is shown in FIG. 6(c). When the variation rate reaches a predetermined value, the expansion mode control signal ordering harder damping characteristics is output to switch the damping mode from SOFT mode to HARD mode, as shown in periods labeled H in FIG. 6(d). The damping mode is switched back to SOFT mode from the HARD mode when the variation rate decreases across a zero.

On the other hand, during the piston compression stroke, the fluid pressure in the lower working chamber 15 is monitored by both of the first and second piezoelectric elements 60 and 90. The first piezoelectric element 60 then produces the compression mode pressure indicative signal Sp. At the same time, the second piezoelectric element 90 produces the expansion mode pressure indicative signal Ss. Therefore, judgement is then made that the piston is in the compression stroke by the arithmetic circuit 120. Therefore, the arithmetic circuit 120 calculates variation rate of the compression mode pressure indicative Sp. When the variation rate derived on the basis of the compression mode pressure indicative signal Sp reaches the predetermined value, the compression mode control signal $S_B$ is output to the second piezoelectric element 90 to switching damping mode from the SOFT mode to HARD mode. Similarly to the expansion mode, the damping mode will be switched back to the SOFT mode when the variation rate decreases across zero.

Figure 7:
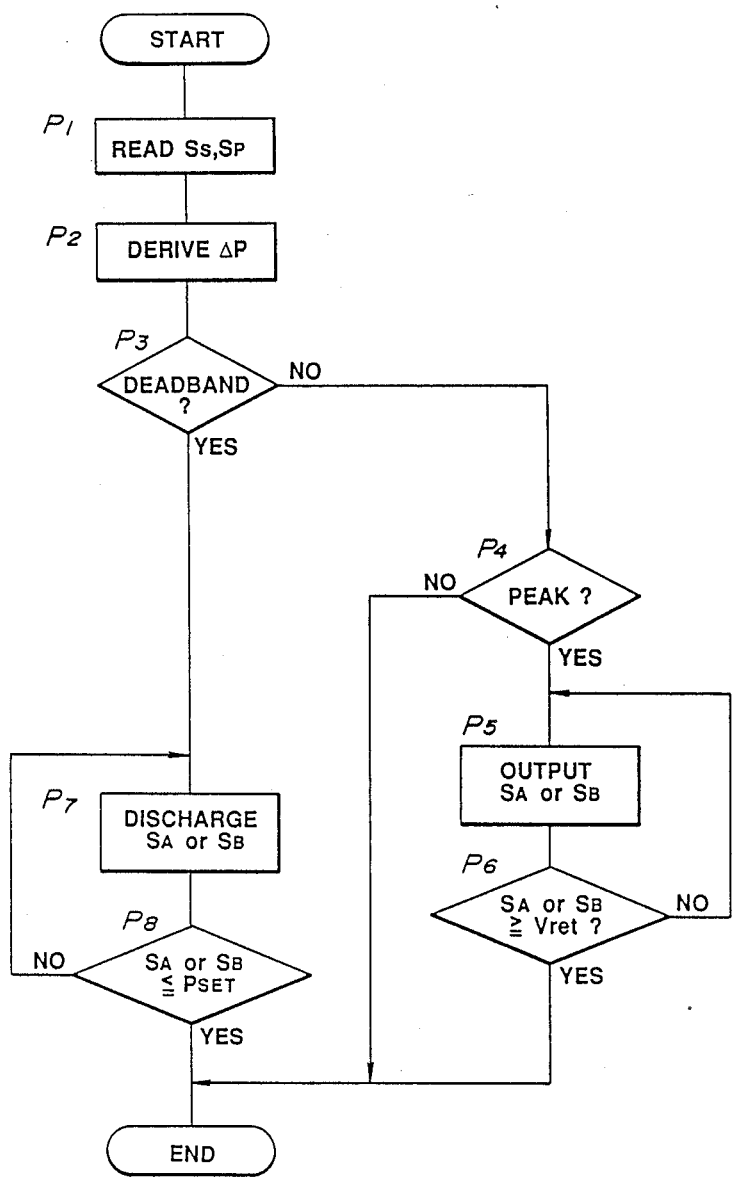
FIG. 7 is a flowchart showing the preferred process of suspension control to be performed in the preferred embodiment of the suspension system.

FIG. 7 shows a flowchart showing operation performed in the arithmetic circuit. Immediately after starting execution, the expansion mode pressure indicative signal Ss and the compression mode pressure indicative signal Sp are read out at a step P1. Then, discrimination is made for the piston stroke direction on the basis of the read expansion mode pressure indicative signal Ss and compression mode pressure indicative signal Sp. As set forth, the piston expansion stroke is detected when the read compression mode pressure indicative signal Sp is held zero. On the other hand, when the compression mode pressure indicative signal Sp is greater than zero, the piston compression stroke is detected. The arithmetic circuit 120 thus selects one of the expansion mode pressure indicative signal Ss and the compression mode pressure indicative signal. Then, at a step P2, variation rate $\Delta P$ is derived on the basis of the selected one of the expansion mode pressure indicative signal Ss and the compression mode pressure indicative signal Sp. Practically, the variation rate $\Delta P$ is calculated by differentiating the selected one of the pressure indicative signals Ss and Sp.

Here, the variation rate $\Delta P$ of the pressure to be exerted on the first and second piezoelectric elements 60 and 0 becomes maximum at the initial space of the piston expansion and compression stroke and becomes minimum (zero) at the peak of vibration. On the other hand, the piston stroke speed becomes higher according to increasing the piston stroke and according to shortening of vibration cycle period. Therefore, by monitoring the variation rate $\Delta P$, magnitude of input vibration can be detected for quicker response. This may provide higher response characteristics to the input vibration in controlling the suspension mode.

It should be appreciated, it is possible to provide a step between the steps P1 and P2 to check the frequency range of the pressure indicative signals for performing suspension control on the basis of the input pressure indicative signal within a predetermined frequency range.

At a step P3, the variation rate $\Delta P$ is checked whether it is in a predetermined deadband which is set with respect to the variation value zero. Namely, the deadband is defined by an upper deadband criterion and a lower deadband criterion. Therefore, the variation rate $\Delta P$ is compared with the upper and lower deadband criteria to make judgement that the variation rate $\Delta P$ is in the deadband when the variation rate is smaller than or equal to the upper deadband criterion and is greater than or equal to the lower deadband. If the variation rate $\Delta P$ as checked at the step P3 is output of the deadband, check is performed whether the variation rate reaches a peak or not, at a step P4. When the peak of the variation rate $\Delta P$ is detected as checked at the step P4, one of the expansion mode control signal $S_A$ or the compression mode control signal SB is output to the corresponding one of the first and second piezoelectric elements 60 and 90 depending upon the discriminated piston stroke direction at a step P5. Then, at a step P6, the voltage level of the expansion mode control signal $S_A$ or the compression mode control signal $S_B$ output at the step P5, is checked whether the voltage level is higher than or equal to a voltage threshold level $V_{ref}$. The voltage threshold level $V_{ref}$ is set at a minimum voltage for causing distortion in the corresponding one of the first and second piezoelectric element 60 or 90 in order to switch damping mode from the SOFT mode to the HARD mode. Unless, the control signal voltage level as checked at the step P5 becomes higher than or equal to the voltage threshold level $V_{ref}$, process returns to the step P5. The steps P4 and P5 are repeated until the control signal voltage level becomes higher than or equal to the minimum voltage level for driving the associated one of the first and second piezoelectric element 60 and 90. When the control signal voltage level becomes higher than or equal to the voltage threshold level $V_{ref}$ as checked at the step P6, then process goes END.

Though the shown embodiment switches the damping mode between two stages, i.e. HARD mode and SOFT mode, it is possible to vary the damping characteristics in either in or both in the HARD and SOFT mode according to the vibration magnitude. Namely, since the distortion magnitude may essentially linearly proportional to the voltage applied thereto, linear or stepless variation of the damping characteristics can be obtained by linearly or steplessly varying the voltage of the control signal. Practically, it may be possible to vary the control signal voltage according to variation of the variation rate $\Delta P$. Furthermore, it may also be possible to determine the control signal voltage corresponding to the peak level of the variation rate $\Delta P$.

On the other hand, the peak of the variation rate $\Delta P$ is not detected as checked at the step P3, check is performed whether it indicates the variation rate is zero, at a step P6. If the variation rate $\Delta P$ is greater than zero as checked at the step P6, process directly goes to END.

On the other hand, when the variation rate $\Delta P$ is within the deadband as checked at the step P3, the switching transistor $Tr_2$ in the corresponding one of the first and second sections 130a and 130b is turned ON to discharge the voltage applied to the piezoelectric element 60 and 90, at a step P7. Then, at a step P8, one of the expansion mode pressure indicative signal Ss and the compression mode pressure indicative signal Sp, which is selected at the step P1, is again checked against a set value $P_{set}$. As long as the checked pressure indicative signal is greater than the set value $P_{set}$ as checked at the step P8, the steps P7 and P8 are repeated to discharge the voltage applied corresponding one of the piezoelectric element 60 or 90 at a level lower than or equal to the set value $P_{set}$.

Figure 8:
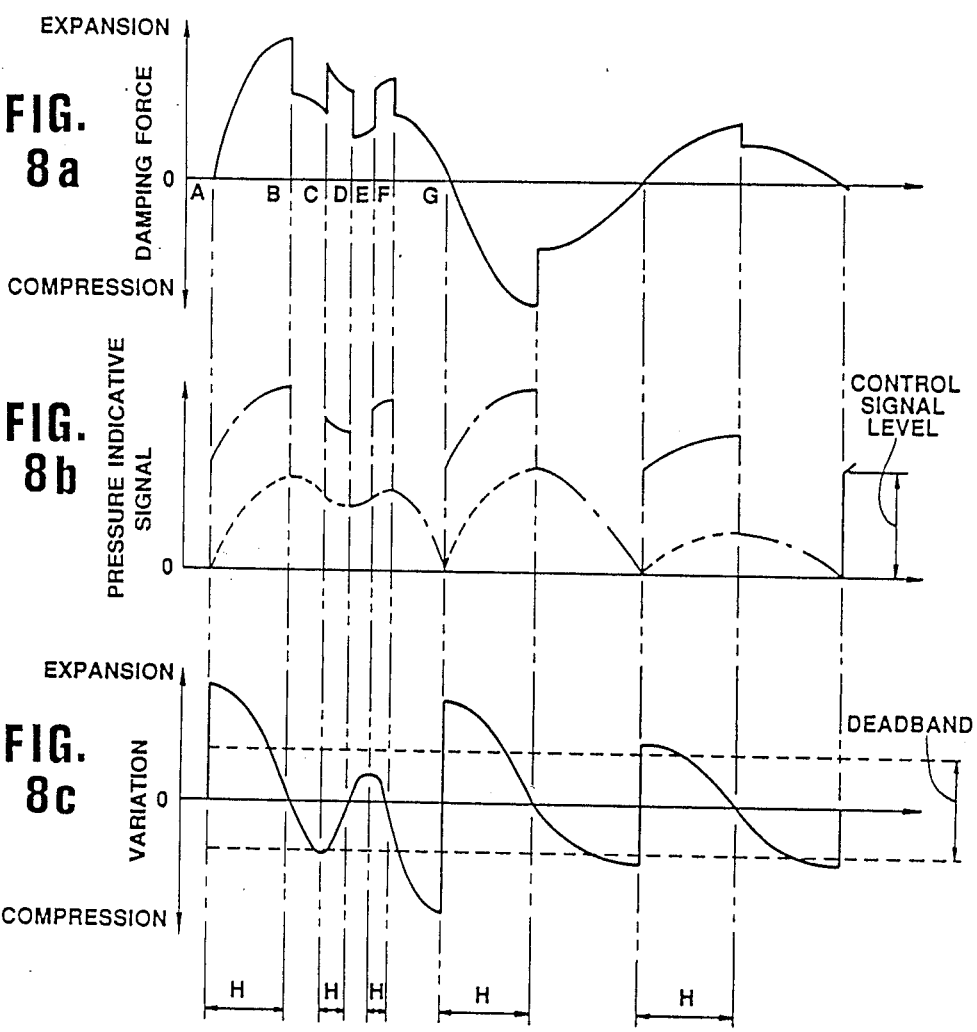
FIG. 8 is timing chart showing control operations performed in the preferred embodiment of the suspension system.

FIG. 8 shows timing chart showing example of operation practically performed in the preferred embodiment of the suspension system according to the present invention. In the shown example, it is assumed that the variation rate $\Delta P$ of the expansion mode pressure indicative signal Ss and the compression mode pressure indicative signal Sp varies as shown in FIG. 8(c). At a point A, the variation rate $\Delta P$ rapidly increased to be greater than or equal to the predetermined value $P_{ref}$. Then, the damping mode is switched from SOFT mode to HARD mode as shown in the period between the point A and a point B. During this period, the pressure indicative signal Ss or Sp is shifted in a magnitude corresponding to the voltage level of the driver signal exerted on the corresponding piezoelectric element, as shown by one-dotted line in FIG. 8(b). As can be seen from FIG. 8(b), the pressure indicative signal thus varies according to variation of the fluid pressure in the corresponding one of the upper and lower working chamber as shown by broken line in FIG. 8(b). At the point B, the vibration reaches the peak thus the variation rate $\Delta P$ becomes zero. In response to this, the damping mode is switched from HARD mode to SOFT mode.

As seen from FIG. 8(a), assuming that the vibration is caused in rebounding direction to cause expansion stroke of the piston, the damping force created against the piston expansion stroke is increased by setting the damping mode at HARD mode as that shown in the period between the point A and the point B. After B, the piston strokes in the compression direction to return the initial position. In such case, the damping mode is set at SOFT mode for effectively absorbing the vibration energy as shown in the period between the point B and a point C. At the point C, variation rate $\Delta P$ in the compression mode reaches a value greater than the predetermined value $P_{ref}$ to again causing switching of the damping mode from SOFT mode to HARD mode. Therefore, from the point C to a point D greater damping force against the piston stroke is generated. Similarly to the process set forth with respect to the point B, the variation rate $\Delta P$ becomes zero at the point D. On the other hand, at the point E, the variation rate $\Delta P$ again reaches the peak. However, since the variation rate is within the deadband as illustrated in FIG. 8(c), the damping mode is not switched into HARD mode and thus is maintained at SOFT mode during the period between the point E and point F. By repeating the foregoing process, the damping modes are switched between HARD mode and SOFT mode during the period between the points F and G.

As will be appreciated herefrom, since the shown embodiment performs damping mode control in piston expansion and compression strokes independently of each other, effective suppression of piston strokes and absorption of the vibration energy can be achieved. Furthermore, in the shown embodiment, since the first piezoelectric element 60 is active for detecting fluid pressure in the lower working chamber 15 during piston compression stroke and the second piezoelectric element 90 is active for adjusting damping mode between the HARD mode and SOFT mode in the piston compression stroke and since the second piezoelectric element 90 is active for detecting fluid pressure in the upper working chamber 14 during piston expansion stroke and the second piezoelectric element 60 is active for adjusting damping mode between the HARD mode and SOFT mode in the piston expansion stroke, monitoring of the fluid pressure and damping mode control can be performed independently at the same time. Therefore, damping mode control with high precision and high response characteristics can be obtained.

In addition, in accordance with the shown embodiment, the shock absorber is maintained in soft against relatively small magnitude of vibration. This will successfully avoid rough ride feeling and thus assures riding comfort. Namely, as is well known, the vibration energy input from the road wheel is usually have small magnitude and high frequency, which vibration energy will not influence for vehicle driving stability and is better to be absorbed so as not to be transmitted to the vehicle body for assuring riding comfort. On the other hand, the vibration energy input from the vehicle body is generally caused by vehicular attitude change. This has to be damped for assuring vehicle driving stability. Therefore, by providing the deadband in controlling damping mode of the shock absorber, both of riding comfort and driving stability can be achieved at high level.

Figure 9:
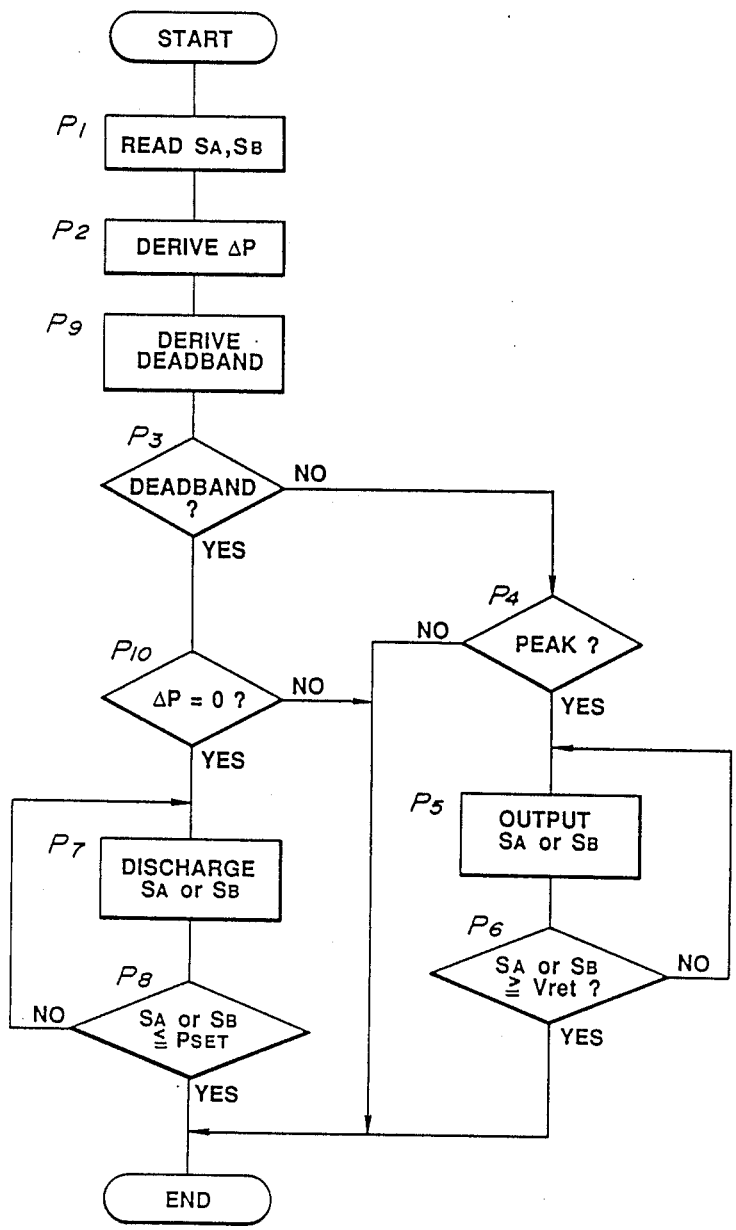
FIG. 9 is a flowchart showing a modified process of suspension control to be preferred embodiment of the suspension system.

On the other hand, the magnitude of vibration energy of road shock and vehicular attitude change tends to be varies according to the vehicle speed. Namely, higher vehicular speed may generate greater magnitude of road shock input from the road wheel and cause greater attitude change on the vehicle body. Therefore, it is further preferable to vary the width of the deadband, i.e. the upper and lower deadband criteria, depending upon the vehicle speed. FIG. 9 shows modification of the routine for controlling damping mode of the shock absorber according to the present invention, in which vehicle speed dependent variable deadband width is introduced for successfully adapting suspension control characteristics to the vehicle driving speed. In the shown routine, an additional step P9 is inserted between the steps P2 and P3 in the routine of FIG. 7. In the additional step P9, the width of the deadband relative to the variation rate zero level is determined according to a vehicle speed. The width of the deadband can be varied in various fashion. In addition, an additional step P10 is added between the steps P3 and P7. In the additional step P10, check whether the variation rate $\Delta P$ is zero or not, is performed. When the variation rate is not zero, process directly goes END jumpting the steps P7 and P8. On the other hand, when the variation rate is zero as checked at the step P10, then process goes to the step P7.

In the shown process adjustment of the width of the deadband can be done in various ways. For example, in FIG. 10, the width of deadband is varied continuously according to variation of the vehicle speed. On the other hand, in the example of FIG. 12, the width of the deadband is varied between wide and narrow when the vehicle speed is varied across a predetermined vehicle speed criterion. It should be appreciated that in either case, the variation characteristics of the width of the deadband may be determined through experiments with respect to the required performance and characteristics of the vehicle to which the suspension system being installed and other factors. As will be seen from FIG. 10, in the former case, the width of the deadband is set broader at low vehicle speed range. When the vehicle speed is lower than a predetermined low vehicle criterion, the width of the deadband is maintained constant at a predetermined maximum value. On the other hand, when the vehicle speed is higher than or equal to the low speed criterion and lower than or equal to a predetermined high vehicle speed criterion, the width of the deadband is varied according to variation of the vehicle speed in non-linear fashion. When the vehicle speed is higher the high vehicle speed criterion, the width of the deadband is maintained at a predetermined minimum width.

Figure 10:
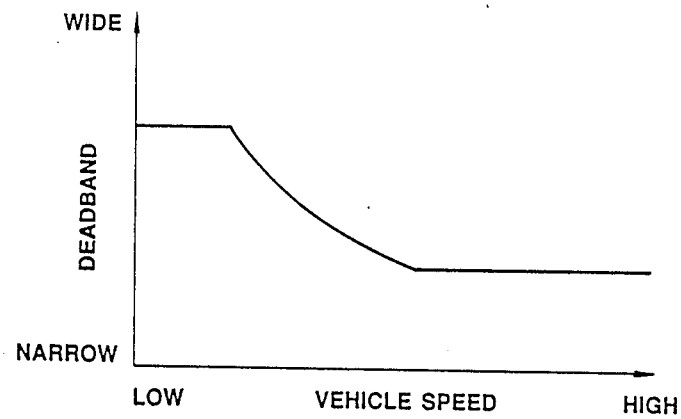
FIG. 10 is a chart showing variation of a deadband in relation to a vehicle speed.

In order to implement the foregoing process, the arithmetic circuit 120 may include a memory for storing the characteristics of FIG. 10 in a form of a look-up table. Table look-up may be performed in terms of the vehicle speed for deriving the deadband width.

Figure 12:
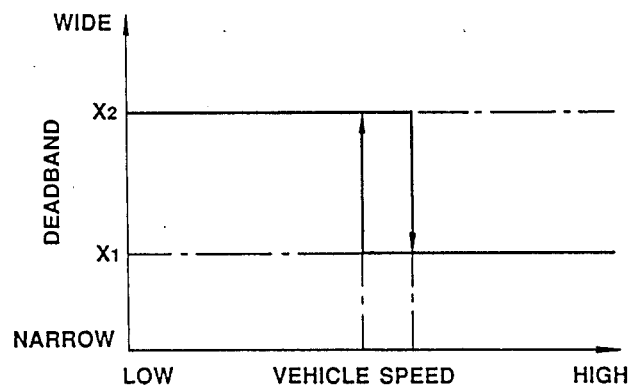
FIG. 12 is a chart showing another manner of variation of a deadband in relation to a vehicle speed.

On the other hand, in the latter case of FIG. 12, the width of the deadband is switched from wider width to narrower width when the vehicle speed increases across a predetermined narrower width criterion and is switched from narrower width to wider width when the vehicle speed decreases across a predetermined narrower width criterion which is set to be lower than the wider width criterion so as to provide histerisis in selection of the wide and narrower width of the deadbands.

In the latter case, it may also be possible to perform different mode of suspension control for respective of front and rear suspension systems. One possible mode is to switch into narrower deadband from wider deadband for both of front and rear suspension systems simultaneously in response to increasing of the vehicle speed across the narrower width criterion. Alternatively, it is possible to switch the width of the deadbands for the front and rear suspension systems at different timing for providing different response characteristics at the front and rear suspension systems.

Figure 11:
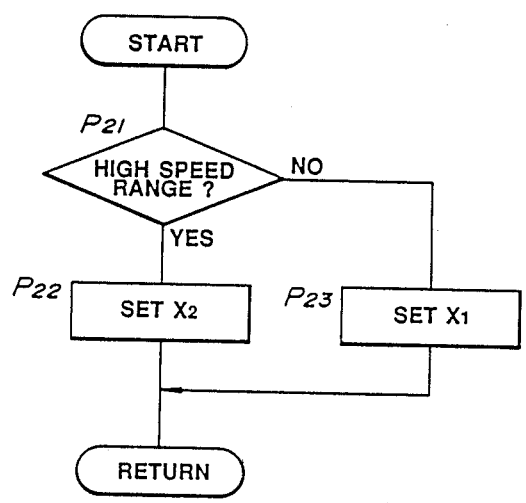
FIG. 11 is a flowchart showing a routine for setting the deadband in relation to the vehicle speed.

Process of switching the width of the deadbands for the front and rear suspension systems simultaneously will be discussed with reference to FIG. 11. As seen from FIG. 11, judgement is performed whether the vehicle speed is in a range demanding narrower width of the deadband, at a step P21. In practice, in the step P21, check is at first performed whether the current width of the deadband is wide or narrow. If the current deadband width is wide $X_2$, the vehicle speed is compared with the narrower width criterion at the step P21. On the other hand, when the current deadband width is narrow $X_1$, the vehicle speed is compared with the wider width criterion at the step P21. When the judgement made in the step P21 that the narrower deadband is required, the width of the deadband is set at narrower width $X_2$ at a step P22. On the other hand, when the judgement made in the step P21 that the wider deadband is required, the width of the deadband is set at wider width $X_1$ at a step P23.

Figure 13:
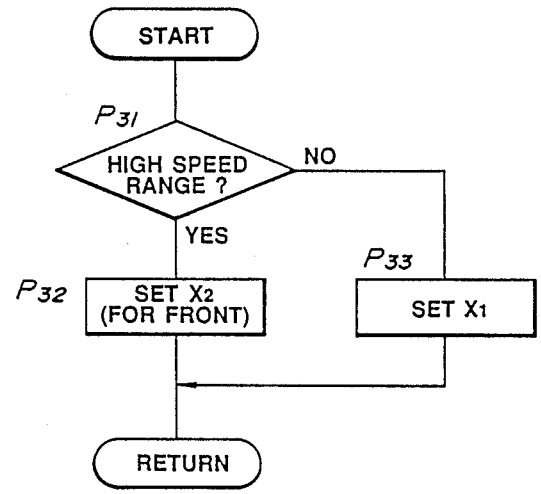
FIG. 13 is a flowchart showing a routine for setting the deadband in relation to the vehicle speed.

Process of setting the width of the deadbands for the front and rear suspension systems at different width will be discussed with reference to FIG. 13. As seen from FIG. 13 and similarly to the former process, judgement is performed whether the vehicle speed is in a range demanding narrower width of the deadband, at a step P31. When the judgement made in the step P31 that the narrower deadband is required, the width of the deadband for the front suspension system is set at narrower width $X_2$ and maintain the width of the deadband for the rear suspension system at the wider width $X_1$ at a step P32. By providing higher response characteristics for the front suspension system, harder damping characteristics can be obtained at the front suspension at earlier timing than the rear suspension system. Because that the weight at the front side of the vehicle is normally greater than the rear side, inertia moment to be created by the vibration is greater than the rear side. Therefore, by providing higher response characteristics, damping efficiency at the front side becomes higher to provide higher vehicular stability. This would be particularly beneficial to introduce for a front-engine, front-wheel drive type vehicle. On the other hand, when the judgement made in the step P21 that the wider deadband is required, the width of the deadband of both of the front and rear suspension systems is set at wider width $X_1$ at a step P33.

Though the specific processes in setting the deadband are discussed hereabove, it may be possible to take various processes and manners for setting the width of the deadband. For example, though the example of FIG. 13 sets the width of the deadbands for the front and rear suspension systems at different width by maintaining the deadband width of the rear system at wider width in all vehicle speed range, it may also be possible to set the width of the deadband for the rear suspension system at a value narrower than the wider width but wider than the narrower width. In the alternative, it may also be possible to use different criteria of the vehicle speed to switch the width of the deadband between wider width and narrower width.

Figure 14:
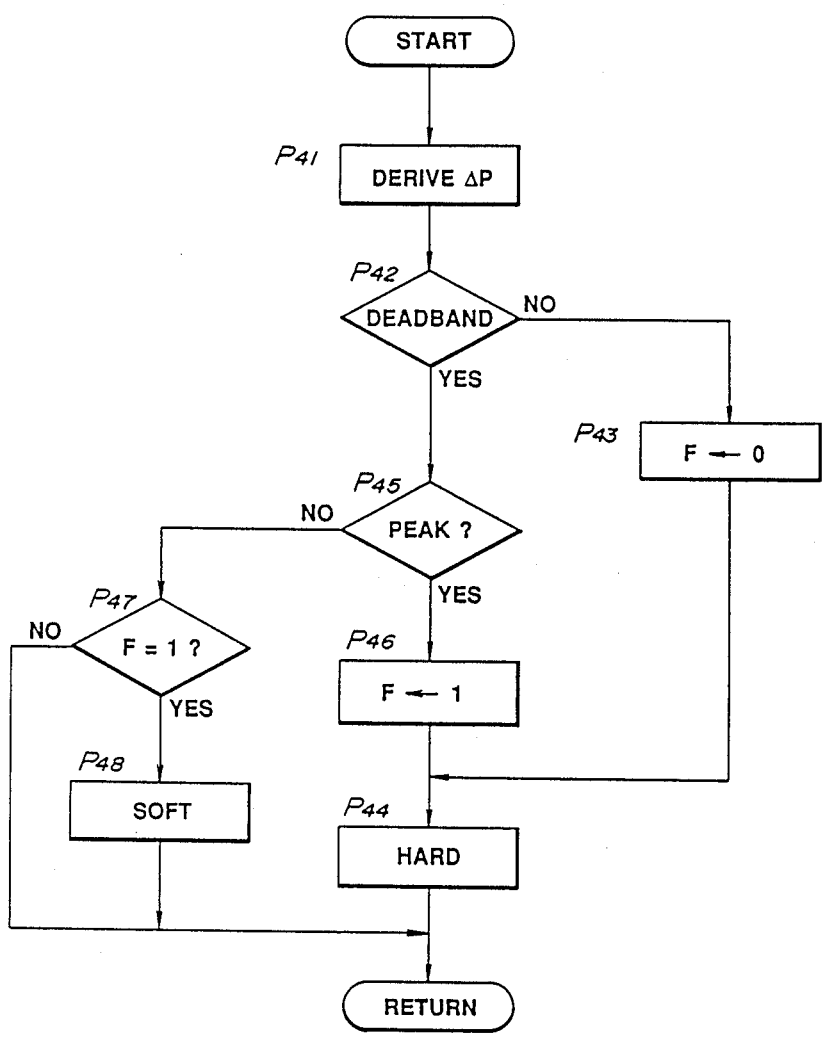
FIG. 14 is a flowchart showing another preferred routine for performing suspension control.

FIG. 14 shows another process of suspension control to be performed by the arithmetic circuit 120 for implementing another process of suspension control according to the invention. In the shown process, suspension characteristics is normally maintained at HARD mode for creating greater damping force for higher driving stability without causing degradation of the riding comfort. For this, the shown process, at first, read out the pressure indicative signals Sp and Ss and selects one of the pressure indicative signals depending upon the piston stroke direction, at a step P41. At the step P41, arithmetic operation is performed for deriving the variation rate ΔP. Then, the variation rate ΔP is compared with a predetermined deadband criteria for discriminating whether the variation rate is within or out of the deadband, at a step P42. When the variation rate ΔP is within the deadband as checked at the step P42, a HARD mode indicative flag F is reset at a step P43. Subsequently, a HARD mode control signal is fed one of the upper and lower piezoelectric elements 60 and 90 which is selected depending upon the piston stroke direction, is fed for increasing flow restriction and thus harden damping characteristics, at a step P44. Thereafter process goes to END. On the other hand, when the variation rate ΔP as checked at the step P42 is output the deadband, then check is performed whether the variation rate reaches a peak value or not at a step P45. If the peak value of the variation rate ΔP is detected at the step P45, the HARD mode indicative flag F is set at a step P46. Subsequently, the process goes to the step P44, in which the HARD mode control signal is fed one of the upper and lower piezoelectric elements 60 and 90 which is selected depending upon the piston stroke direction, is fed for increasing flow restriction and thus harden damping characteristics. If the variation rate ΔP as checked at the step P45 is not the peak value, then, further check is performed at a step P47 whether the HARD mode indicative flag F is set. If the HARD mode flag F is not set as checked at the step P47, then the SOFT mode control signal is fed to the corresponding one of the upper and lower piezoelectric element 60 and 90 for switching damping mode into SOFT mode at a step P48. On the other hand, if the HARD mode indicative flag F is set as checked at the step P47, then process directly goes to END.

Though the process set forth above, suspension control is performed to maintain the damping characteristics of the shock absorber HARD mode while the variation rate ΔP is maintained within the deadband. This means that since judgement can be made than the vehicle is traveling on a substantially smooth road, HARD mode suspension characteristics may not cause substantial degradation of the riding comfort and may providing higher driving stability. When the magnitude of vibration becomes greater to cause increasing of the variation rate output of the deadband, the damping characteristics is maintained SOFT for effectively absorbing vibration energy. The damping mode is maintained at SOFT mode until the variation rate reaches the peak. After the variation rate reaches the peak, the damping mode is switched into HARD mode for effectively damping reactive motion for earlier stabilization of the vibration. The HARD damping mode is maintained until the variation rate varies across the deadband criteria.

Such process may provide higher driving stability with maintaining the riding comfort at satisfactory level.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An automotive suspension system comprising:
   a shock absorber disposed between a vehicle body and a suspension member rotatably supporting a road wheel, said shock absorber including a cylinder tube connected to one of said vehicle body and said suspension member and defining an internal space, a piston disposed within said internal space for dividing said internal space into first and second chambers and connected to the other of said vehicle body and said suspension member for relative movement with respect to said cylinder tube, said first and second chambers being filled with a working fluid;
   a fluid communication means for establishing fluid communication between said first and second chambers with a limited fluid flow rate for generating a damping force against relative motion between said piston and said cylinder tube;
   a valve means associated with said fluid communication means for controlling flow restriction of said fluid communication means, said valve means being variable of flow restriction characteristics for varying damping characteristics of said shock absorber;
   a sensor means for monitoring fluid pressure in said first chamber for producing a piston stroke indicative signal indicative of magnitude of piston stroke;
   an actuating means, associated with said valve means and responsive to a control signal, for controlling said valve means for adjusting flow restriction characteristics according said said control signal; and
   a controlling means, receiving said piston stroke indicative signal, for deriving a piston motion representative data on the basis of said piston stroke indicative signal, comparing said piston motion representative data with a predetermined deadband criteria which are set with respect to a neutral value and defining a predetermined deadband, and detecting said piston motion representative data out of said deadband and reaching a peak value for producing said control signal for harder damping characteristics and detecting said piston motion representative data varying across said neutral value for producing said control signal for softer damping characteristics.

2. An automotive suspension system as set forth in claim 1, wherein said sensor means comprises a first piezoelectric element and said actuating means comprises a second piezoelectric element.

3. An automotive suspension system as set forth in claim 1, wherein said controlling means increases said control signal value at a predetermined rate for increasing flow restriction at a predetermined rate.

4. An automotive suspension system as set forth in claim 1, wherein said controlling means decreases said control signal value at a predetermined rate for decreasing flow restriction at a predetermined rate.

5. An automotive suspension system as set forth in claim 1, wherein said controlling means derives flow restriction to be represented by said control signal on the basis of a peak value of said variation rate of said pressure indicative signal.

6. An automotive suspension system as set forth in claim 1, which further comprises a vehicle speed sensor for monitoring a vehicle speed to produce a vehicle speed indicative signal, and said arithmetic means varies said deadband criteria according to variation of the value of said vehicle speed indicative signal.

7. An automotive suspension system as set forth in claim 6, wherein said arithmetic means continuously varies said deadband criteria for varying the width of said deadband according to variation of the value of said vehicle speed indicative signal.

8. An automotive suspension system as set forth in claim 6, wherein said arithmetic means varies said deadband criteria for varying the width of said deadband in stepwise fashion according to variation of the value of said vehicle speed indicative signal.

9. An automotive suspension system as set forth in claim 8, wherein said arithmetic means varies the width of said deadband between a first wider width and a second narrower width which is selected when the value of said vehicle speed indicative signal is greater than a predetermined first vehicle speed criterion.

10. An automotive suspension system as set forth in claim 9, wherein said arithmetic means sets a second vehicle speed criterion at a value smaller than said first vehicle speed criterion for switching said width of said deadband from said narrower width to said wider width when said vehicle speed indicative signal value decreases thereacross.

11. An automotive suspension system comprising:
a shock absorber disposed between a vehicle body and a suspension member rotatably supporting a road wheel, said shock absorber including a cylinder tube connected to one of said vehicle body and said suspension member and defining an internal space, a piston disposed within said internal space for dividing said internal space into first and second chambers and connected to the other of said vehicle body and said suspension member for relative movement with respect to said cylinder tube, said first and second chambers being filled with a working fluid;
a fluid communication means for establishing fluid communication between said first and second chambers with a limited fluid flow rate for generating a damping force against relative motion between said piston and said cylinder tube;
a valve means associated with said fluid communication means for controlling flow restriction of said fluid communication means, said valve means being variable of flow restriction characteristics for varying damping characteristics of said shock absorber;
a sensor means for monitoring fluid pressure in said first chamber for producing a piston stroke indicative signal indicative of magnitude of piston stroke;
an actuating means, associated with said valve means and responsive to a control signal, for controlling said valve means for adjusting flow restriction characteristics according said said control signal; and
a controlling means, receiving said piston stroke indicative signal, for deriving a piston motion representative data on the basis of said piston stroke indicative signal, comparing said piston motion representative data with a predetermined deadband criteria which are set with respect to a neutral value and defining a predetermined deadband, and detecting said piston motion representative data out of said deadband and reaching a peak value for producing said control signal for harder damping characteristics and detecting said piston motion representative data entering into said deadband for producing said control signal for softer damping characteristics.

12. An automotive suspension system as set forth in claim 11, wherein said sensor means comprises a first piezoelectric element and said actuating means comprises a second piezoelectric element.

13. An automotive suspension system as set forth in claim 11, wherein said controlling means increases said control signal value at a predetermined rate for increasing flow restriction at a predetermined rate.

14. An automotive suspension system as set forth in claim 11, wherein said controlling means decreases said control signal value at a predetermined rate for decreasing flow restriction at a predetermined rate.

15. An automotive suspension system as set forth in claim 11, wherein said controlling means derives flow restriction to be represented by said control signal on the basis of a peak value of said variation rate of said pressure indicative signal.

16. An automotive suspension system as set forth in claim 11, which further comprises a vehicle speed sensor for monitoring a vehicle speed to produce a vehicle speed indicative signal, and said arithmetic means varies said deadband criteria according to variation of the value of said vehicle speed indicative signal.

17. An automotive suspension system as set forth in claim 16, wherein said arithmetic means continuously varies said deadband criteria for varying the width of said deadband according to variation of the value of said vehicle speed indicative signal.

18. An automotive suspension system as set forth in claim 16, wherein said arithmetic means varies said deadband criteria for varying the width of said deadband in stepwise fashion according to variation of the value of said vehicle speed indicative signal.

19. An automotive suspension system as set forth in claim 18, wherein said arithmetic means varies the width of said deadband between a first wider width and a second narrower width which is selected when the value of said vehicle speed indicative signal is greater than a predetermined first vehicle speed criterion.

20. An automotive suspension system as set forth in claim 19, wherein said arithmetic means sets a second vehicle speed criterion at a value smaller than said first vehicle speed criterion for switching said width of said deadband from said narrower width to said wider width when said vehicle speed indicative signal value decreases thereacross.

21. An automotive suspension system comprising:
a shock absorber disposed between a vehicle body and a suspension member rotatably supporting a road wheel, said shock absorber including a cylinder tube connected to one of said vehicle body and said suspension member and defining an internal space, a piston disposed within said internal space for dividing said internal space into first and second chambers and connected to the other of said vehicle body and said suspension member for relative movement with respect to said cylinder tube, said first and second chambers being filled with a working fluid;
a fluid communication means for establishing fluid communication between said first and second chambers with a limited fluid flow rate for generating a damping force against relative motion between said piston and said cylinder tube;

a valve means associated with said fluid communication means for controlling flow restriction of said fluid communication means, said valve means being variable of flow restriction characteristics for varying damping characteristics of said shock absorber;

a sensor means for monitoring fluid pressure in said first chamber for producing a piston stroke indicative signal indicative of magnitude of piston stroke;

an actuating means, associated with said valve means and responsive to a control signal, for controlling said valve means for adjusting flow restriction characteristics according said said control signal; and a controlling means, receiving said piston stroke indicative signal, for deriving a piston motion representative data on the basis of said piston stroke indicative signal, comparing said piston motion representative data with a predetermined deadband criteria which are set with respect to a neutral value and defining a predetermined deadband for producing said control signal for harder damping characteristics, and detecting said piston motion representative data varying across one of said deadband criteria to be out of said deadband for producing said control signal for softer damping characteristics, detecting said piston motion representative data reaching a peak value for producing said control signal for harder damping characteristics.

22. An automotive suspension system as set forth in claim 21, wherein said sensor means comprises a first piezoelectric element and said actuating means comprises a second piezoelectric element.

23. An automotive suspension system as set forth in claim 21, wherein said controlling means increases said control signal value at a predetermined rate for increasing flow restriction at a predetermined rate.

24. An automotive suspension system as set forth in claim 21, wherein said controlling means decreases said control signal value at a predetermined rate for decreasing flow restriction at a predetermined rate.

25. An automotive suspension system as set forth in claim 21, wherein said controlling means derives flow restriction to be represented by said control signal on the basis of a peak value of said variation rate of said pressure indicative signal.

26. An automotive suspension system as set forth in claim 21, which further comprises a vehicle speed sensor for monitoring a vehicle speed to produce a vehicle speed indicative signal, and said arithmetic means varies said deadband criteria according to variation of the value of said vehicle speed indicative signal.

27. An automotive suspension system as set forth in claim 26, wherein said arithmetic means continuously varies said deadband criteria for varying the width of said deadband according to variation of the value of said vehicle speed indicative signal.

28. An automotive suspension system as set forth in claim 26, wherein said arithmetic means varies said deadband criteria for varying the width of said deadband in stepwise fashion according to variation of the value of said vehicle speed indicative signal.

29. An automotive suspension system as set forth in claim 28, wherein said arithmetic means varies the width of said deadband between a first wider width and a second narrower width which is selected when the value of said vehicle speed indicative signal is greater than a predetermined first vehicle speed criterion.

30. An automotive suspension system as set forth in claim 29, wherein said arithmetic means sets a second vehicle speed criterion at a value smaller than said first vehicle speed criterion for switching said width of said deadband from said narrower width to said wider width when said vehicle speed indicative signal value decreases thereacross.

31. An automotive suspension system comprising:

a shock absorber disposed between a vehicle body and a suspension member rotatably supporting a road wheel, said shock absorber including a cylinder tube connected to one of said vehicle body and said suspension member and defining an internal space, a piston disposed within said internal space for dividing said internal space into first and second chambers and connected to the other of said vehicle body and said suspension member for relative movement with respect to said cylinder tube, said first and second chambers being filled with a working fluid;

a fluid communication means for establishing fluid communication between said first and second chambers with a limited fluid flow rate for generating a damping force against relative motion between said piston and said cylinder tube;

a valve means associated with said fluid communication means for controlling flow restriction of said fluid communication means, said valve means being variable of flow restriction characteristics for varying damping characteristics of said shock absorber;

a sensor means for monitoring fluid pressure in said first chamber for producing a fluid pressure indicative signal indicative of magnitude of fluid pressure;

an actuating means, associated with said valve means and responsive to a control signal, for controlling said valve means for adjusting flow restriction characteristics according said said control signal; and a controlling means, receiving said fluid pressure indicative signal, for deriving a pressure variation representative data on the basis of said fluid pressure indicative signal, comparing said pressure variation representative data with a predetermined deadband criteria which are set with respect to a neutral value and defining a predetermined deadband, and detecting said pressure variation representative data out of said deadband and reaching a peak value for producing said control signal for harder damping characteristics and detecting said pressure variation representative data varying across said neutral value for producing said control signal for softer damping characteristics.

32. An automotive suspension system as set forth in claim 31, wherein said sensor means comprises a first piezoelectric element and said actuating means comprises a second piezoelectric element.

33. An automotive suspension system as set forth in claim 31, wherein said controlling means increases said control signal value at a predetermined rate for increasing flow restriction at a predetermined rate.

34. An automotive suspension system as set forth in claim 31, wherein said controlling means decreases said control signal value at a predetermined rate for decreasing flow restriction at a predetermined rate.

35. An automotive suspension system as set forth in claim 31, wherein said controlling means derives flow restriction to be represented by said control signal on the basis of a peak value of said variation rate of said pressure indicative signal.

36. An automotive suspension system as set forth in claim 31, which further comprises a vehicle speed sensor for monitoring a vehicle speed to produce a vehicle speed indicative signal, and said arithmetic means varies said deadband criteria according to variation of the value of said vehicle speed indicative signal.

37. An automotive suspension system as set forth in claim 36, wherein said arithmetic means continuously varies said deadband criteria for varying the width of said deadband according to variation of the value of said vehicle speed indicative signal.

38. An automotive suspension system as set forth in claim 36, wherein said arithmetic means varies said deadband criteria for varying the width of said deadband in stepwise fashion according to variation of the value of said vehicle speed indicative signal.

39. An automotive suspension system as set forth in claim 38, wherein said arithmetic means varies the width of said deadband between a first wider width and a second narrower width which is selected when the value of said vehicle speed indicative signal is greater than a predetermined first vehicle speed criterion.

40. An automotive suspension system as set forth in claim 39, wherein said arithmetic means sets a second vehicle speed criterion at a value smaller than said first vehicle speed criterion for switching said width of said deadband from said narrower width to said wider width when said vehicle speed indicative signal value decreases thereacross.

41. An automotive suspension system comprising:
a shock absorber disposed between a vehicle body and a suspension member rotatably supporting a road wheel, said shock absorber including a cylinder tube connected to one of said vehicle body and said suspension member and defining an internal space, a piston disposed within said internal space for dividing said internal space into first and second chambers and connected to the other of said vehicle body and said suspension member for relative movement with respect to said cylinder tube, said first and second chambers being filled with a working fluid;
a fluid communication means for establishing fluid communication between said first and second chambers with a limited fluid flow rate for generating a damping force against relative motion between said piston and said cylinder tube;
a valve means associated with said fluid communication means for controlling flow restriction of said fluid communication means, said valve means being variable of flow restriction characteristics for varying damping characteristics of said shock absorber;
a sensor means for monitoring fluid pressure in said first chamber for producing a fluid pressure indicative signal indicative of magnitude of fluid pressure;
an actuating means, associated with said valve means and responsive to a control signal, for controlling said valve means for adjusting flow restriction characteristics according said said control signal; and a controlling means, receiving said fluid pressure indicative signal, for deriving a pressure variation representative data on the basis of said fluid pressure indicative signal, comparing said pressure variation representative data with a predetermined deadband criteria which are set with respect to a neutral value and defining a predetermined deadband, and detecting said pressure variation representative data out of said deadband and reaching a peak value for producing said control signal for harder damping characteristics and detecting said pressure variation representative data entering into said deadband for producing said control signal for softer damping characteristics.

42. An automotive suspension system as set forth in claim 41, wherein said sensor means comprises a first piezoelectric element and said actuating means comprises a second piezoelectric element.

43. An automotive suspension system as set forth in claim 41, wherein said controlling means increases said control signal value at a predetermined rate for increasing flow restriction at a predetermined rate.

44. An automotive suspension system as set forth in claim 41, wherein said controlling means decreases said control signal value at a predetermined rate for decreasing flow restriction at a predetermined rate.

45. An automotive suspension system as set forth in claim 41, wherein said controlling means derives flow restriction to be represented by said control signal on the basis of a peak value of said variation rate of said pressure indicative signal.

46. An automotive suspension system as set forth in claim 41, which further comprises a vehicle speed sensor for monitoring a vehicle speed to produce a vehicle speed indicative signal, and said arithmetic means varies said deadband criteria according to variation of the value of said vehicle speed indicative signal.

47. An automotive suspension system as set forth in claim 46, wherein said arithmetic means continuously varies said deadband criteria for varying the width of said deadband according to variation of the value of said vehicle speed indicative signal.

48. An automotive suspension system as set forth in claim 46, wherein said arithmetic means varies said deadband criteria for varying the width of said deadband in stepwise fashion according to variation of the value of said vehicle speed indicative signal.

49. An automotive suspension system as set forth in claim 48, wherein said arithmetic means varies the width of said deadband between a first wider width and a second narrower width which is selected when the value of said vehicle speed indicative signal is greater than a predetermined first vehicle speed criterion.

50. An automotive suspension system as set forth in claim 49, wherein said arithmetic means sets a second vehicle speed criterion at a value smaller than said first vehicle speed criterion for switching said width of said deadband from said narrower width to said wider width when said vehicle speed indicative signal value decreases thereacross.

51. An automotive suspension system comprising:
a shock absorber disposed between a vehicle body and a suspension member rotatably supporting a road wheel, said shock absorber including a cylinder tube connected to one of said vehicle body and said suspension member and defining an internal space, a piston disposed within said internal space for dividing said internal space into first and second chambers and connected to the other of said vehicle body and said suspension member for relative movement with respect to said cylinder tube, said first and second chambers being filled with a working fluid;

a fluid communication means for establishing fluid communication between said first and second chambers with a limited fluid flow rate for generating a damping force against relative motion between said piston and said cylinder tube;

a valve means associated with said fluid communication means for controlling flow restriction of said fluid communication means, said valve means being variable of flow restriction characteristics for varying damping characteristics of said shock absorber;

a sensor means for monitoring fluid pressure in said first chamber for producing a fluid pressure indicative signal indicative of magnitude of fluid pressure;

an actuating means, associated with said valve means and responsive to a control signal, for controlling said valve means for adjusting flow restriction characteristics according said said control signal; and a controlling means, receiving said fluid pressure indicative signal, for deriving a pressure variation representative data on the basis of said fluid pressure indicative signal, comparing said pressure variation representative data with a predetermined deadband criteria which are set with respect to a neutral value and defining a predetermined deadband for producing said control signal for harder damping characteristics, and detecting said pressure variation representative data varying across one of said deadband criteria to be out of said deadband for producing said control signal for softer damping characteristics, detecting said pressure variation representative data reaching a peak value for producing said control signal for harder damping characteristics.

52. An automotive suspension system as set forth in claim 51, wherein said sensor means comprises a first piezoelectric element and said actuating means comprises a second piezoelectric element.

53. An automotive suspension system as set forth in claim 51, wherein said controlling means increases said control signal value at a predetermined rate for increasing flow restriction at a predetermined rate.

54. An automotive suspension system as set forth in claim 51, wherein said controlling means decreases said control signal value at a predetermined rate for decreasing flow restriction at a predetermined rate.

55. An automotive suspension system as set forth in claim 51, wherein said controlling means derives flow restriction to be represented by said control signal on the basis of a peak value of said variation rate of said pressure indicative signal.

56. An automotive suspension system as set forth in claim 51, which further comprises a vehicle speed sensor for monitoring a vehicle speed to produce a vehicle speed indicative signal, and said arithmetic means varies said deadband criteria according to variation of the value of said vehicle speed indicative signal.

57. An automotive suspension system as set forth in claim 56, wherein said arithmetic means continuously varies said deadband criteria for varying the width of said deadband according to variation of the value of said vehicle speed indicative signal.

58. An automotive suspension system as set forth in claim 56, wherein said arithmetic means varies said deadband criteria for varying the width of said deadband in stepwise fashion according to variation of the value of said vehicle speed indicative signal.

59. An automotive suspension system as set forth in claim 58, wherein said arithmetic means varies the width of said deadband between a first wider width and a second narrower width which is selected when the value of said vehicle speed indicative signal is greater than a predetermined first vehicle speed criterion.

60. An automotive suspension system as set forth in claim 59, wherein said arithmetic means sets a second vehicle speed criterion at a value smaller than said first vehicle speed criterion for switching said width of said deadband from said narrower width to said wider width when said vehicle speed indicative signal value decreases thereacross.

* * * * *